(12) United States Patent
Levitsky et al.

(10) Patent No.: US 12,526,025 B2
(45) Date of Patent: Jan. 13, 2026

(54) TWO STEP REPORTING PROCEDURE FOR DEMODULATION REFERENCE SIGNAL CONFIGURATION ADJUSTMENT

(71) Applicant: QUALCOMM INCORPORATED, San Diego, CA (US)

(72) Inventors: Michael Levitsky, Rehovot (IL); Peter Gaal, San Diego, CA (US); Alexandros Manolakos, Escondido, CA (US); Chenxi Hao, Beijing (CN); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 18/002,458

(22) PCT Filed: Sep. 3, 2020

(86) PCT No.: PCT/CN2020/113195
§ 371 (c)(1),
(2) Date: Dec. 19, 2022

(87) PCT Pub. No.: WO2022/047691
PCT Pub. Date: Mar. 10, 2022

(65) Prior Publication Data
US 2023/0231610 A1    Jul. 20, 2023

(51) Int. Cl.
*H04B 7/06* (2006.01)
*H04L 5/00* (2006.01)
(52) U.S. Cl.
CPC ......... *H04B 7/0632* (2013.01); *H04B 7/0639* (2013.01); *H04L 5/0051* (2013.01)
(58) Field of Classification Search
CPC ... H04B 7/0632; H04B 7/0639; H04L 5/0051; H04L 5/0053; H04L 5/0057
See application file for complete search history.

(56) References Cited

U.S. PATENT DOCUMENTS 9,337,974 B2   5/2016  Miao et al.
11,071,098 B2  7/2021  Manolakos et al.
(Continued)

FOREIGN PATENT DOCUMENTS

CN   104753647 A   7/2015
CN   108123778 A   6/2018
(Continued)

OTHER PUBLICATIONS

Li H., et al., "CSI-RS Based CQI Measurement", Guangdong Communication Technology, Dec. 20, 2016, Nov. 15, 2016, 15 pages.
(Continued)

*Primary Examiner* — Kevin C. Harper
*Assistant Examiner* — Salma Ayad
(74) *Attorney, Agent, or Firm* — Holland & Hart LLP

(57) ABSTRACT

Methods, systems, and devices for wireless communications are described that support a two-step reporting procedure for demodulation reference signal (DMRS) configuration adjustment. A base station may transmit to a user equipment (UE) control information indicating a subset of DMRS configurations to be addressed for DMRS configuration selection and reporting. As a part of channel state feedback (CSF) evaluation procedures the UE may identify link quality characteristics and spectral efficiency metrics corresponding to the subset of DMRS configurations and determine a preference for a configuration change from the currently used DMRS configuration (which is represented by DMRS configuration determined from channel state information (CSI) reference slot) to a DMRS configuration of the subset based on the link spectral efficiency metrics comparison. The UE may transmit to the base station, a report comprising an indication of a UE request for the configuration change and in response, the base station may (Continued)

schedule the UE to report one or more selected DMRS configurations most convenient for the UE channel and reception conditions.

30 Claims, 20 Drawing Sheets

(56) References Cited

U.S. PATENT DOCUMENTS

| | | | |
|---|---|---|---|
| 2015/0282123 | A1 | 10/2015 | Miao et al. |
| 2015/0373694 | A1* | 12/2015 | You .................. H04L 5/0051 370/329 |
| 2016/0020879 | A1 | 1/2016 | Shimezawa et al. |
| 2019/0052527 | A1* | 2/2019 | Ghosh ................ H04L 25/0224 |

FOREIGN PATENT DOCUMENTS

| | | |
|---|---|---|
| CN | 110582969 A | 12/2019 |
| CN | 110798891 A | 2/2020 |
| CN | 111357235 A | 6/2020 |
| WO | 2014126519 A1 | 8/2014 |
| WO | WO-2016061824 A1 | 4/2016 |
| WO | WO-2019099517 | 5/2019 |

OTHER PUBLICATIONS

International Search Report and Written Opinion—PCT/CN2020/113195—ISA/EPO—Jun. 2, 2021.
Supplementary European Search Report—EP20951938—Search Authority—The Hague—Apr. 22, 2024.

* cited by examiner

TWO STEP REPORTING PROCEDURE FOR DEMODULATION REFERENCE SIGNAL CONFIGURATION ADJUSTMENT

CROSS REFERENCE

The present Application is a 371 national stage filing of International PCT Application No. PCT/CN2020/113195 by Levitsky et al. entitled "TWO STEP REPORTING PROCEDURE FOR DEMODULATION REFERENCE SIGNAL CONFIGURATION ADJUSTMENT," filed Sep. 3, 2020, which is assigned to the assignee hereof, and which is expressly incorporated by reference in its entirety herein.

FIELD OF TECHNOLOGY

The following relates to wireless communications, including two step reporting procedure for demodulation reference signal (DMRS) configuration adjustment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications system may support a radio resource control (RRC) configured DMRS configuration that may not be changed "on the fly" without introducing some service or link interruption. When channel conditions change, however, utilizing a fixed configured DMRS configuration may cause a wireless device (e.g., a base station or a UE) to inaccurately estimate the channel. That is, the used DMRS pattern is not optimal for the current channel and reception conditions. Alternatively, some wireless communication may support adaptive DMRS configurations. That is, a UE may report a selected and most appropriate for the current channel and reception conditions DMRS configuration to a base station based on estimated link quality characteristics, spectral efficiency, some estimated channel parameters, etc. as part of a channel state feedback (CSF) report (e.g., a joint DMRS and CSF report). However, channel condition changes constituting a new DMRS configuration may occur infrequently and repeated periodic CSF reports indicating the selected DMRS configuration may not be informative and increase overhead signaling.

SUMMARY

The described techniques relate to improved methods, systems, devices, and apparatuses that support two step reporting procedure for demodulation reference signal (DMRS) configuration adjustment. Generally, the described techniques provide for a user equipment (UE) to indicate to a base station a preference or a request for a DMRS configuration change and in response, the base station may schedule the UE to report a set of selected DMRS configurations. The UE may determine a preference for a DMRS configuration change based on comparing the corresponding link quality characteristics, channel quality indicator (CQI) values, etc., of a first DMRS configuration relative to a second DMRS configuration. In some examples, the DMRS configuration change request may be included in a periodic channel state feedback (CSF) report and as a response to a DMRS configuration change request indicated in periodic CSF report, the UE may be scheduled with an aperiodic extended CSF report (e.g. a joint DMRS and CSF report). The extended aperiodic CSF report may include a one or more selected or preferred DMRS configurations and the corresponding CQI or full CSF descriptors for each selected DMRS configuration.

A method of wireless communications at a UE is described. The method may include receiving, from a base station, control information indicating a subset of DMRS configurations to be addressed for DMRS configuration selection and reporting, the subset of a set of DMRS configurations supported by the UE, identifying a set of link quality characteristics for a channel, the set of link quality characteristics corresponding to the subset of DMRS configurations, determining a UE preference for a configuration change from a first DMRS configuration to a second DMRS configuration included in the subset based on the set of link quality characteristics, the first DMRS configuration determined based on a channel state information reference resource, the second DMRS configuration allowing a DMRS overhead reduction, a corresponding estimated link quality characteristic improvement, a corresponding link spectral efficiency improvement, an increase in a determined CQI, or any combination thereof, relative to the first DMRS configuration, and transmitting, to the base station, a report including an indication of a UE request for the configuration change based on the UE preference.

An apparatus for wireless communications at a UE is described. The apparatus may include a processor, memory coupled with the processor, and instructions stored in the memory. The instructions may be executable by the processor to cause the apparatus to receive, from a base station, control information indicating a subset of DMRS configurations to be addressed for DMRS configuration selection and reporting, the subset of a set of DMRS configurations supported by the UE, identify a set of link quality characteristics for a channel, the set of link quality characteristics corresponding to the subset of DMRS configurations, determine a UE preference for a configuration change from a first DMRS configuration to a second DMRS configuration included in the subset based on the set of link quality characteristics, the first DMRS configuration determined based on a channel state information reference resource, the second DMRS configuration allowing a DMRS overhead reduction, a corresponding estimated link quality characteristic improvement, a corresponding link spectral efficiency improvement, an increase in a determined CQI, or any combination thereof, relative to the first DMRS configuration, and transmit, to the base station, a report including an indication of a UE request for the configuration change based on the UE preference.

Another apparatus for wireless communications at a UE is described. The apparatus may include means for receiving, from a base station, control information indicating a subset of DMRS configurations to be addressed for DMRS configuration selection and reporting, the subset of a set of DMRS configurations supported by the UE, identifying a set of link quality characteristics for a channel, the set of link quality characteristics corresponding to the subset of DMRS configurations, determining a UE preference for a configuration change from a first DMRS configuration to a second DMRS configuration included in the subset based on the set of link quality characteristics, the first DMRS configuration determined based on a channel state information reference resource, the second DMRS configuration allowing a DMRS overhead reduction, a corresponding estimated link quality characteristic improvement, a corresponding link spectral efficiency improvement, an increase in a determined CQI, or any combination thereof, relative to the first DMRS configuration, and transmitting, to the base station, a report including an indication of a UE request for the configuration change based on the UE preference.

A non-transitory computer-readable medium storing code for wireless communications at a UE is described. The code may include instructions executable by a processor to receive, from a base station, control information indicating a subset of DMRS configurations to be addressed for DMRS configuration selection and reporting, the subset of a set of DMRS configurations supported by the UE, identify a set of link quality characteristics for a channel, the set of link quality characteristics corresponding to the subset of DMRS configurations, determine a UE preference for a configuration change from a first DMRS configuration to a second DMRS configuration included in the subset based on the set of link quality characteristics, the first DMRS configuration determined based on a channel state information reference resource, the second DMRS configuration allowing a DMRS overhead reduction, a corresponding estimated link quality characteristic improvement, a corresponding link spectral efficiency improvement, an increase in a determined CQI, or any combination thereof, relative to the first DMRS configuration, and transmit, to the base station, a report including an indication of a UE request for the configuration change based on the UE preference.

In some examples of the method, apparatuses, and non-transitory computer-readable medium described herein, transmitting the report may include operations, features, means, or instructions for transmitting a periodic CSF report including a channel state information resource indicator (CRI), a rank indicator (RI), a precoding matrix indicator (PMI), a CQI, a strongest layer indicator (SLI), or any combination thereof.

In some examples of the method, apparatuses, and non-transitory computer-readable medium described herein, transmitting the report may include operations, features, means, or instructions for transmitting, in an uplink message, an indicator within a demodulation configuration change request field that indicates the UE request for the configuration change.

In some examples of the method, apparatuses, and non-transitory computer-readable medium described herein, the indicator may be a one bit indicator.

Some examples of the method, apparatuses, and non-transitory computer-readable medium described herein may further include operations, features, means, or instructions for receiving, from the base station and prior to transmitting an initial CSF report, a control message scheduling an aperiodic report for joint DMRS and CSF reporting, and transmitting the aperiodic report that includes one or more DMRS configurations of the subset of DMRS configurations for selection and reporting and one or more corresponding CQIs or corresponding CSF in response to the control message.

In some examples of the method, apparatuses, and non-transitory computer-readable medium described herein, receiving the message may include operations, features, means, or instructions for receiving the message after completion of a long discontinuous reception cycle duration, a beam switch procedure, a reconfiguration of the UE, or any combination thereof.

In some examples of the method, apparatuses, and non-transitory computer-readable medium described herein, the aperiodic report includes a refreshed list of one or more bundles of a DMRS and corresponding CQIs selected by the UE or configured for reporting.

Some examples of the method, apparatuses, and non-transitory computer-readable medium described herein may further include operations, features, means, or instructions for selecting one or more of the subset of DMRS configurations associated with one or more scheduling scenarios and configured by the base station to be addressed by the aperiodic report, where the aperiodic report includes the one or more selected DMRS configurations from the configured subset and a corresponding one or more CQIs or CSF.

Some examples of the method, apparatuses, and non-transitory computer-readable medium described herein may further include operations, features, means, or instructions for receiving, from the base station, a configuration for the aperiodic report, the configuration indicating a list of DMRS configurations to be addressed in the aperiodic report, where the one or more of the subset of the DMRS configurations may be selected based on the configuration and where the one or more of the subset of the DMRS configurations may be reported with corresponding CQIs or corresponding CSF.

Some examples of the method, apparatuses, and non-transitory computer-readable medium described herein may further include operations, features, means, or instructions for receiving, from the base station and in response to the UE report for the configuration change, a message scheduling an aperiodic report for joint DMRS and CSF reporting, and transmitting an extended joint DMRS and CSF report to the base station in response to the message.

In some examples of the method, apparatuses, and non-transitory computer-readable medium described herein, the extended joint DMRS and CSF report includes one or more bundles of a DMRS and a corresponding CQI, a joint subband DMRS and CSF report, a joint DMRS and CSF report per transport block (TB) or per code division multiplexing (CDM) group, or any combination thereof.

Some examples of the method, apparatuses, and non-transitory computer-readable medium described herein may further include operations, features, means, or instructions for determining each DMRS for the one or more reported bundles based on a configuration for the aperiodic report, and determining respective CQIs for each DMRS of the one or more bundles.

Some examples of the method, apparatuses, and non-transitory computer-readable medium described herein may further include operations, features, means, or instructions for determining that the DMRS overhead reduction, the estimated link quality characteristic improvement, the link spectral efficiency improvement, or any combination thereof, associated with the second DMRS configuration exceeds a threshold, and determining a configuration change request bit based on the DMRS overhead reduction, the estimated link quality characteristic, the link spectral efficiency, or any combination thereof exceeding the threshold.

Some examples of the method, apparatuses, and non-transitory computer-readable medium described herein may further include operations, features, means, or instructions for determining that the second DMRS configuration maintains at least a same CQI as the first DMRS configuration based on the set of link quality characteristics, and determining a configuration change request bit based on the second DMRS configuration maintaining at least the same CQI as the first DMRS configuration.

Some examples of the method, apparatuses, and non-transitory computer-readable medium described herein may further include operations, features, means, or instructions for determining a CQI index of the second DMRS configuration to be greater than a CQI index of the first DMRS configuration based on the set of link quality characteristics, and determining a configuration change request bit based on the CQI index of the second DMRS configuration being greater than the CQI index of the first DMRS configuration.

A method of wireless communications at a base station is described. The method may include identifying a set of DMRS configurations supported by a UE served by the base station based on a capability of the UE, transmitting, to the UE, control information indicating a subset of DMRS configurations of the set of DMRS configurations to be addressed for DMRS configuration selection and reporting, and receiving, from the UE, a report including an indication of a UE request for a DMRS configuration change based on a set of link quality characteristics at the UE.

An apparatus for wireless communications at a base station is described. The apparatus may include a processor, memory coupled with the processor, and instructions stored in the memory. The instructions may be executable by the processor to cause the apparatus to identify a set of DMRS configurations supported by a UE served by the base station based on a capability of the UE, transmit, to the UE, control information indicating a subset of DMRS configurations of the set of DMRS configurations to be addressed for DMRS configuration selection and reporting, and receive, from the UE, a report including an indication of a UE request for a DMRS configuration change based on a set of link quality characteristics at the UE.

Another apparatus for wireless communications at a base station is described. The apparatus may include means for identifying a set of DMRS configurations supported by a UE served by the base station based on a capability of the UE, transmitting, to the UE, control information indicating a subset of DMRS configurations of the set of DMRS configurations to be addressed for DMRS configuration selection and reporting, and receiving, from the UE, a report including an indication of a UE request for a DMRS configuration change based on a set of link quality characteristics at the UE.

A non-transitory computer-readable medium storing code for wireless communications at a base station is described. The code may include instructions executable by a processor to identify a set of DMRS configurations supported by a UE served by the base station based on a capability of the UE, transmit, to the UE, control information indicating a subset of DMRS configurations of the set of DMRS configurations to be addressed for DMRS configuration selection and reporting, and receive, from the UE, a report including an indication of a UE request for a DMRS configuration change based on a set of link quality characteristics at the UE.

In some examples of the method, apparatuses, and non-transitory computer-readable medium described herein, receiving the report may include operations, features, means, or instructions for receiving a periodic CSF report including a CRI, a RI, a PMI, a CQI, SLI, or any combination thereof.

In some examples of the method, apparatuses, and non-transitory computer-readable medium described herein, receiving the report may include operations, features, means, or instructions for receiving, in an uplink message, an indicator within a demodulation configuration change request field that indicates the UE request for the DMRS configuration change.

In some examples of the method, apparatuses, and non-transitory computer-readable medium described herein, the indicator may be a one bit indicator.

Some examples of the method, apparatuses, and non-transitory computer-readable medium described herein may further include operations, features, means, or instructions for transmitting, to the UE and prior to receiving an initial CSF report from the UE, a message scheduling an aperiodic report for joint DMRS and CSF reporting, and receiving, from the UE, the aperiodic report that includes one or more DMRS configurations of the subset for DMRS configurations that were addressed for selection and reporting and one or more corresponding CQIs or corresponding CSF in response to the message.

In some examples of the method, apparatuses, and non-transitory computer-readable medium described herein, transmitting the message may include operations, features, means, or instructions for transmitting the message after completion of a long discontinuous reception cycle duration, a beam switch procedure, a reconfiguration of the UE, or any combination thereof.

In some examples of the method, apparatuses, and non-transitory computer-readable medium described herein, the aperiodic report includes a refreshed list of one or more bundles of a DMRS and corresponding CQIs selected by the UE or configured for reporting.

Some examples of the method, apparatuses, and non-transitory computer-readable medium described herein may further include operations, features, means, or instructions for transmitting, to the UE, a configuration for the aperiodic report, the configuration indicating a number of bundles of a DMRS and a corresponding CQI or CSF, a list of DMRS configurations for including in the aperiodic report, or any combination thereof.

Some examples of the method, apparatuses, and non-transitory computer-readable medium described herein may further include operations, features, means, or instructions for transmitting, to the UE and in response to the UE report indicating the DMRS configuration change request, a message scheduling an aperiodic report for joint DMRS and CSF reporting, and receiving an extended joint DMRS and CSF report from the UE in response to the message.

In some examples of the method, apparatuses, and non-transitory computer-readable medium described herein, the extended joint DMRS and CSF report includes one or more bundles of a DMRS and a corresponding CQI, a joint subband DMRS and CSF report, a joint DMRS and CSF report per TB or per CDM group, or any combination thereof.

In some examples of the method, apparatuses, and non-transitory computer-readable medium described herein, the second DMRS configuration allows a DMRS overhead reduction, a corresponding estimated link quality characteristic improvement, a corresponding link spectral efficiency improvement, an increase in a determined CQI, or any combination of thereof, relative to the first DMRS configuration by a threshold.

Some examples of the method, apparatuses, and non-transitory computer-readable medium described herein may further include operations, features, means, or instructions for transmitting, to the UE, the threshold for determination of the UE request for the DMRS change.

DETAILED DESCRIPTION

Figure 1:
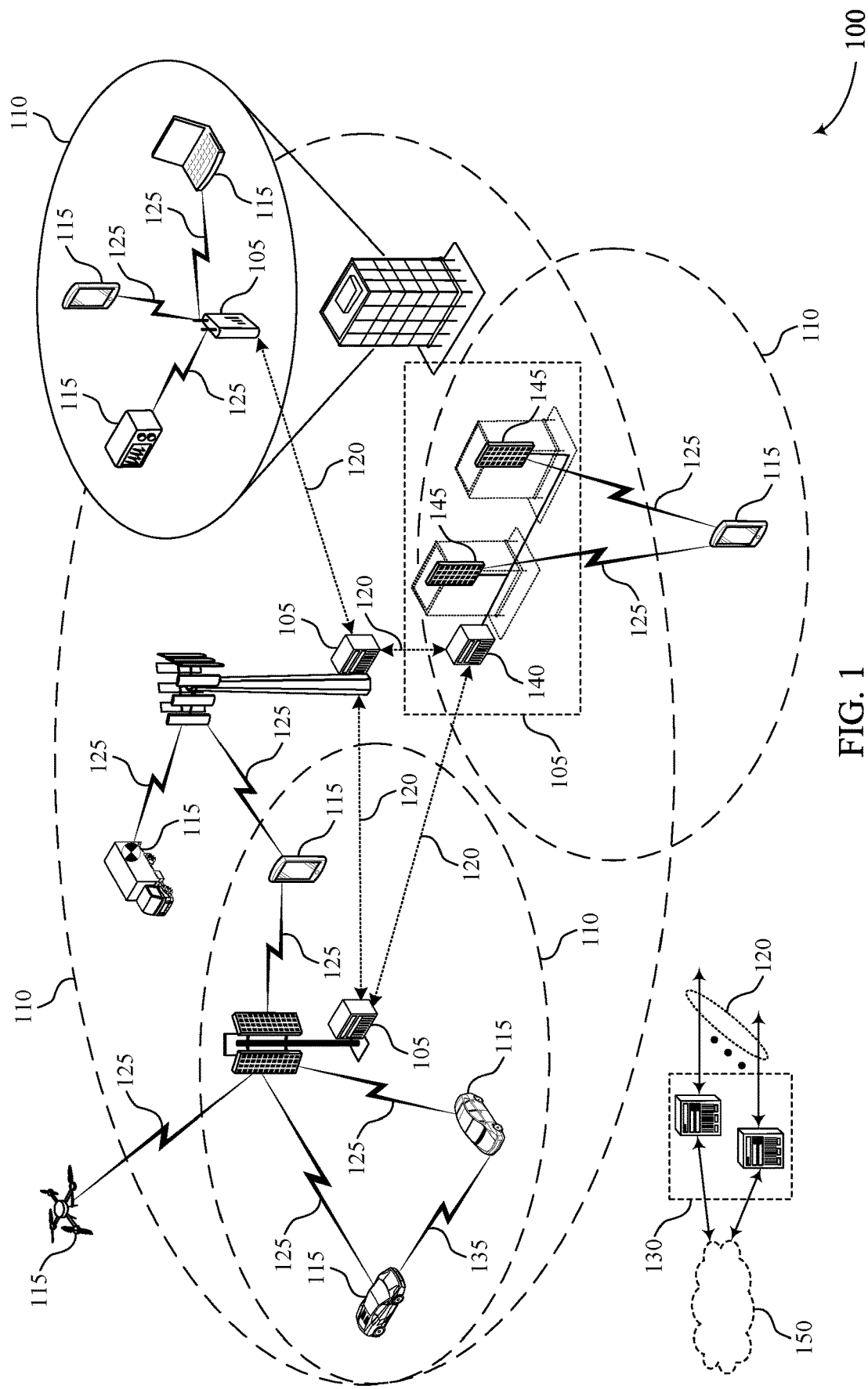
FIGS. 1 and 2 illustrate examples of a wireless communications system that supports two step reporting procedure for demodulation reference signal (DMRS) configuration adjustment in accordance with aspects of the present disclosure.

Some wireless communications systems may utilize a demodulation reference signal (DMRS) for data reception. For example, a base station may transmit the DMRS to a UE and the UE may use the DMRS to perform a channel estimation which is required in case of coherent communication schemes for demodulation and decoding data transmitted on a corresponding data channel (e.g., a physical downlink shared channel (PDSCH)). The DMRS may be transmitted in accordance with a DMRS configuration. For example, in configuration type 1, the minimum resource element group in the frequency domain is one resource element (RE) and in configuration type 2, the minimum resource element group in the frequency domain is two consecutive REs. In some examples, the DMRS configuration may be fixed (e.g., not dynamic) or quasi statically configured by RRC without a practical option for reconfiguration. That is, a UE may be configured with a specific and fixed DMRS configuration for all communications with the base station. However, as channel conditions change, using the same DMRS configuration may lead to inaccurate channel estimations which may cause unsuccessful data decoding and corresponding performance degradation and/or poor link utilization. That is, link efficiency will not be maximized with a fixed DMRS configuration in conjunction with a changing channel condition.

In some examples, wireless communications system may support adaptive DMRS configurations. For example, a base station may configure the UE with a list of possible DMRS configurations. The UE may select a DMRS configuration from the list of DMRS configurations and periodically report the selected and most appropriate for its channel and reception conditions DMRS configuration to the base station as part of a channel state feedback (CSF) report or as a DMRS report or in a joint DMRS and CSF report. In response, the base station may use one or more DMRSs for transmissions to the UE based on the selected DMRS configurations. However, if the UE is configured to report a DMRS configuration in a periodic CSF report (e.g., multiple CSF reports), the UE may repeatedly report the same selected DMRS configuration to the base station. Periodic reporting of the same selected DMRS configuration may not be informative to the network and may increase overhead and resource usage. Additionally, if a UE periodically reports the selected DMRS configuration without a quantitative value associated with the selected DMRS configuration (e.g., channel quality indicator (CQI)), the network may have no knowledge of why a particular DMRS configuration was selected by the UE and as a result, the network may be unable to compare the reported selected DMRS configurations with one another. Comparing reported DMRS configuration with other DMRS configuration preferences from the BS side may aid in the selection of a DMRS configuration by the base station when taking into account scheduling constraints and power optimization.

Some wireless communications systems may support a two-step DMRS reporting procedure. For example, a UE may transmit a request for a change in DMRS configuration to the base station (e.g., via a DMRS reconfiguration request). In some examples, the DMRS reconfiguration request may be triggered if one or more conditions are satisfied. For example, the network may configure the UE with a list of possible DMRS configurations and the UE may select a single DMRS configuration from the list of DMRS configurations based on link quality characteristics, among other values. The UE may also determine a CQI value associated with selected DMRS configuration and a recent representative DMRS configuration that is identified from channel state information (CSI) reference resource slot (e.g., the current DMRS configuration). The UE may indicate a preference for a DMRS configuration change if the value of a CQI associated with the selected DMRS configuration increases by at least one index when compared to the current DMRS configuration. Additionally or alternatively, the UE may transmit the DMRS reconfiguration request if the overhead associated with the selected DMRS configuration is less than the overhead of the current DMRS configuration (e.g., overhead reduction satisfies a threshold) or there is an expected improvement in spectral efficiency of the link (e.g., spectral efficiency improvement satisfies a threshold). In some examples, the DMRS reconfiguration request may be added to a periodic CSF report in the form of a one bit indication. The bit may be set to a value of 1 if one or more of the above conditions (e.g., overhead reduction, spectral efficiency improvement, or CQI index increase) are met and the bit may be set to a value of 0 if the one or more conditions are not met.

In the case that the UE requests a DMRS configuration change, the base station may schedule the UE to transmit a preferred DMRS configuration report which may include one or more selected DMRS configurations and channel quality values (e.g., CQI) associated with the one or more preferred DMRS configurations. In some examples, the DMRS configuration report may be an aperiodic joint DMRS and CSF report and may include a set of selected DMRS configurations per subband, transport block (TB), or code-division multiplexing (CDM) group. The base station may use one or more DMRS configurations for transmissions to the UE based on the selected one or more DMRS configurations indicated in the DMRS configuration report and the UE may use the DMRS to aid in channel estimation. That is for the described two step approach, the UE may only report its selected DMRS configurations if a DMRS configuration is of higher quality (e.g., is expected to be associated with improved spectral efficiency) as compared to the currently used DMRS configuration which may reduce the amount of repeated DMRS reports that do not provide any new information. In addition, the UE may report CQI values associated with the selected DMRS configurations which may provide to a BS a kind of scheduling portfolio where several most convenient DMRS configurations are listed with the corresponding to them CQI values and may be addressed by BS scheduler for different scheduling scenarios to ease trade offing of different scheduling constraints. For different scheduling scenarios (e.g., different allocation duration, different co-scheduling of multiple UEs, different slot types, slots including CSI-RS, TRS, synchronization signal block (SSB), and etc.), the base station may select a DMRS configuration from the one or more DMRS configurations indicated in the DMRS preference report and use this configuration for transmissions to the UE according to the scheduling scenario.

Aspects of the disclosure are initially described in the context of wireless communications systems. Additional aspects are described in the context of CSF report designs and process flows. Aspects of the disclosure are further illustrated by and described with reference to apparatus diagrams, system diagrams, and flowcharts that relate to two step reporting procedure for DMRS configuration adjustment.

FIG. 1 illustrates an example of a wireless communications system 100 that supports two step reporting procedure for DMRS configuration adjustment in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Wireless communications system 100 may support a two-step reporting procedure for DMRS configuration adjustment. For example, UE 115 may indicate to a base station 105 a preference or a request for a DMRS configuration change. In response, the base station 105 may schedule the UE 115 to report a set of selected DMRS configurations (e.g., in an aperiodic DMRS report or extended CSF report or in an extended joint DMRS and CSF report). The UE 115 may determine a preference for a DMRS configuration change based on comparing link quality characteristics, CQI values, etc. of a first DMRS configuration (e.g., current DMRS configuration) with that of a second DMRS configuration (e.g., candidate DMRS configuration). In some examples, the request may be a one-bit indicator included in a periodic CSF report and the UE 115 may report the set of selected DMRS reports as part of an aperiodic CSF, DMRS, or joint DMRS and CSF report scheduled by the base station 105 in response to the request.

Figure 2:
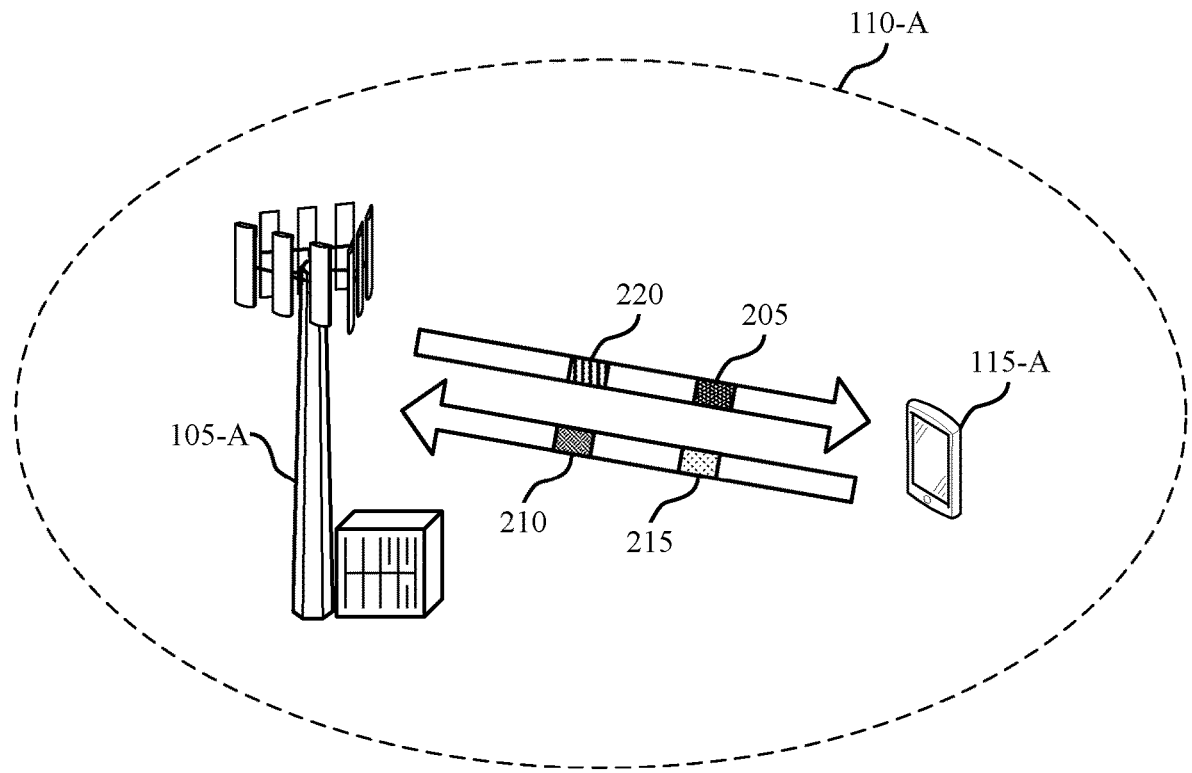

FIG. 2 illustrates an example of a wireless communications system 200 that supports two step reporting procedure for DMRS configuration adjustment in accordance with aspects of the present disclosure. In some examples, wireless communications system 200 may implement aspects of wireless communications system 100. For example, wireless communications system 200 may include base station 105-$a$ and UE 115-$a$, which may be examples of a base station 105 and a UE 115 as described with reference to FIG. 1. Base station 105-$a$ may serve coverage area 110-$a$.

The wireless communications system 200 may support DMRS to aid in channel estimation. For example, base station 105-$a$ may transmit DMRS 220 to UE 115-$a$ and UE 115-$a$ may use DMRS 220 for radio channel estimation for demodulation of an associated physical channel. DMRS 220 may be transmitted on a physical downlink shared channel (PDSCH) or on a physical uplink shared channel (PUSCH). DMRS pattern used for transmission of DMRS 220 may change depending on a DMRS configuration. For example, in configuration type 1, the minimum resource element group in the frequency domain is one resource element (RE) and in configuration type 2, the minimum resource element group in the frequency domain is two consecutive REs. In some examples, base station 105-$a$ and UE 115-$a$ may utilize a single specific DMRS configuration for all communications. For example, base station 105-$a$ may transmit control information 205 to UE 115-$a$ (e.g., via RRC signaling) indicating a specific DMRS configuration. That is, UE 115-$a$ may use the same DMRS configuration for all communications with base station 105-$a$. However, in some cases, the condition of the channel may change throughout communications and the current DMRS configuration may be not suitable for the new channel condition That is, link efficiency will not be maximized with the fixed DMRS configuration in conjunction with a changing channel conditions or the used DMRS configuration may cause to unsuccessful data decoding and the corresponding performance degradation and/or poor link utilization.

In some examples, a UE 115 may report CSI to a base station 115. For example, base station 105-$a$ may transmit one or more reference signals (e.g., channel state information reference signals (CSI-RS)) to UE 115-$a$. UE 115-$a$ may measure the reference signals and transmit a CSF report to base station 105-$a$. The CSF report may include CSI such as a CQI, a precoding matrix indicator (PMI), a precoding type indicator (PTI), channel state information resource indicator (CRI), a strongest layer indicator (SLI), a rank indicator (RI) or any combination thereof. The CSF report may be transmitted to base station 115-$a$ aperiodically or periodically or semi persistently.

Some wireless communications systems may support adaptive DMRS configurations. For example, base station 105-$a$ may transmit control information 205 to UE 115-$a$ which may include a configured list of DMRS configurations. UE 115-$a$ may evaluate the list of possible DMRS configurations and select one or more DMRS configurations for subsequent communications with base station 105-$a$. UE 115 may transmit the selected one or more DMRS configurations to base station 105-$a$ in DMRS configuration report 215 and base station 105-$a$ may transmit DMRS 220 to UE 115-$a$ based on the one or more selected DMRS configuration.

In some examples, DMRS configuration report 215 may be transmitted as part of CSF report. For example, UE 115-$a$ may be configured with a list of possible DMRS configurations (e.g., DMRS hypotheses) via control information 205. As part of CSF procedure, UE 115-$a$ may select, from the network configured list of DMRS configurations, one or more DMRS configurations to report to base station 105-$a$ in DMRS configuration report 215. UE 115-$a$ may select the preferred DMRS configuration by comparing the spectral efficiency, link quality characteristics, etc. of communications over the channel relative to the other DMRS configurations. UE 115-$a$ may use the parameters of one or more reference signals (e.g., DMRS) and a set of estimated channel characteristics (e.g., Doppler frequency, delay spread, signal to noise ratio (SNR)) to estimate multiple link quality characteristics (e.g., multiple post processing SINRs) and the corresponding spectral efficiencies associated with multiple tested DMRS configurations as part of CSF evaluation procedure. In addition, for periodic CSF reporting UE 115-$a$ may evaluate the CSF report based on DMRS configuration parameters derived from a CSI reference resource slot. That is, UE 115-$a$ may determine a CQI value associated with a recent representative DMRS configuration (e.g., currently used DMRS configuration) that is identified from CSI reference resource slot. UE 115-$a$ may then transmit the joint DMRS and CSF report to base station 105-$a$ which may include DMRS configuration report 215 and the entire CSF report associated with the currently used DMRS configuration identified from the CSI reference resource slot.

In order for periodic CSF reporting to trace dynamic DMRS configurations introduced by DMRS adaptation in downlink (e.g., CQI consistent with the current DMRS configuration), for CSI reference resource assumptions it may be defined to address a number of front-loaded DMRS symbols for a physical downlink shared channel (PDSCH) allocation as for PDSCH allocation on a CSI reference resource slot. For the CSI reference resource it may be also assumed/defined that a number of additional DMRS symbols and all DMRS locations relative to the first symbol of the PDSCH allocation are based on DMRS configuration for PDSCH allocation on CSI reference resource slot and a predefined assumption of PDSCH allocation duration of 12 OFDM symbols. In addition, for CSI reference resource it may be also defined that DMRS type may be also assumed as for the PDSCH allocation on the CSI reference resource slot and also it may be assumed that PDSCH allocation contains DMRS symbols and DMRS boosting or a corresponding number of DMRS CDM groups without data is as for the PDSCH allocation on the CSI reference resource slot and constrained/consistent to the selected for CSF reporting RI. Additionally, the CSI reference resource assumptions may also be updated to assume physical resource block (PRB) bundling size matching the reported PRB bundling size in case that PRB bundling size recommendation is included in CSF report. If PRB bundling size is not reported, assume PRB bundling size of 2 PRBs for CSI reference resource.

In some examples, DMRS configuration report 215 may be transmitted as part of an aperiodic CSF report. For example, UE 115-a may be configured with a list of DMRS configurations to be addressed for DMRS selection and reporting (e.g., DMRS hypotheses) via control information 205. As part of the aperiodic CSF evaluation procedure, UE 115-a may select, from the network configured list of DMRS configurations, one or more most appropriate to the channel and reception conditions DMRS configurations. UE 115-a may select the one or more DMRS configurations by comparing the spectral efficiency, link quality characteristics, etc. estimated for communication link over the channel and associated with each of the DMRS configurations of the list of DMRS configurations. UE 115-a may use the parameters of one or more reference signals (e.g., DMRS) and a set of estimated channel characteristics (e.g., Doppler frequency, delay spread, signal to noise ratio (SNR)) to estimate multiple link quality characteristics (e.g., multiple post processing SINRs) and the corresponding spectral efficiencies associated with multiple DMRS configurations as part of the aperiodic CSF evaluation procedure. Additionally, UE 115-a may determine a CQI value associated with each of the selected one or more DMRS configurations. That is, UE 115-a may determine one or more DMRS configuration and CQI bundles. The one or more DMRS configuration and CQI bundles may be included in DMRS configuration report 215 and transmitted to base station 105-a as part of an extended aperiodic CSF report. DMRS configuration and CQI bundles may also be reported per subband, TB, or CDM group.

To report a joint CSF/CQI and DMRS configuration report, for CSI reference resource assumptions it may be defined to assume a PDSCH allocation duration according to the selected DMRS option (assumes a specific allocation duration). In addition, for the CSI reference resource definitions it may be updated to assume a number of front-loaded DMRS symbols according to the selected DMRS option and a number of additional DMRS symbols and all DMRS symbol locations relative to the first symbol of the PDSCH according to the selected DMRS option. In addition, the CSI reference resource assumptions definitions may be modified to assume DMRS type according to the selected DMRS configuration and to assume that PDSCH allocation contains DMRS symbols and that DMRS boosting or a corresponding number of DMRS CDM groups without data is according to the selected DMRS configuration and constrained to the RI selected for CSF reporting.

Wireless communications system 200 may support a two-step adaptive DMRS reporting procedure. For example, UE 115-a may be configured with a list of DMRS configurations to be addressed for DMRS configuration selection and may transmit DMRS reconfiguration request 210 to base station 105-a in case that a better DMRS configuration option was identified by a UE. DMRS reconfiguration request 210 may indicate to base station 105-a that channel conditions have changed and a new DMRS configuration may be selected. In some examples, DMRS reconfiguration request 210 may be included in a periodic CSF report in the form of a one-bit indication. If the bit value is set to 1, DMRS configuration report 215 (e.g., joint DMRS and CSF report) may be triggered (e.g., base station 105-a may schedule UE 115-a to transmit DMRS configuration report 215). Alternatively, if the bit value is set to 0, DMRS configuration report 215 may not be triggered. In some examples, the bit value may be set to 1 based on satisfying a condition. For example, UE 115-a may select a DMRS configuration based on comparing the spectral efficiency, link quality characteristics, etc. of each of the DMRS configurations of the configured list and determine a corresponding CQI value for each of the DMRS configurations. UE 115-a may then determine a CQI value associated with the currently used (e.g., representative) DMRS configuration using DMRS configuration parameters derived from the CSI reference resource slot. The bit value may be set to 1 if the CQI value associated with the selected DMRS configuration increases at least one index above the CQI value associated with the currently used DMRS configuration. Additionally or alternatively, the bit value may be set to 1 if overhead reduction between the selected DMRS configuration and the currently used DMRS configuration becomes more than a threshold. That is, a bit may be set to 1 if the one or more conditions are met and 0 if the one or more conditions are not met. In some examples, DMRS configuration report 215 (e.g., a joint DMRS and CSF report) may be triggered proactively to determine the initial DMRS configuration and the corresponding to it CSF/CQI for PDSCH transmissions before the first periodic CSF report that may convey only DMRS reconfiguration request bit in addition to CSF evaluated assuming the current DMRS configuration traced based on CSI reference resource slot. Alternatively or additionally, DMRS configuration report 215 (e.g., a joint DMRS and CSF report) may be triggered proactively in any scenario that may involve (with high probability) some channel condition change and a corresponding change in DMRS configuration preference (e.g., long DRX cycle, after beam switch, or after any major reconfiguration).

In response to DMRS reconfiguration request 210 with a bit value of 1 or any other trigger, base station 105-a may schedule UE 115-a to transmit DMRS configuration report 215 (e.g., a joint DMRS and CSF report). The DMRS configuration report 215 may include an indication of one or more DMRS configurations selected by UE 115-a. UE 115-a may select the one or more DMRS configurations by comparing the corresponding estimated spectral efficiency that is associated with each of the DMRS configurations of the list of DMRS configurations. In some examples, DMRS configuration report 215 may be transmitted as part of an aperiodic CSF report. Base station 105-a may receive DMRS configuration report 215 and use one or more DMRS configurations for PDSCH transmissions to UE 115-a based on one of the DMRS configurations indicated in the DMRS configuration report 215. In some example, UE 115-a may report one or more selected DMRS configurations per subband, TB, or CDM group.

Figure 3:
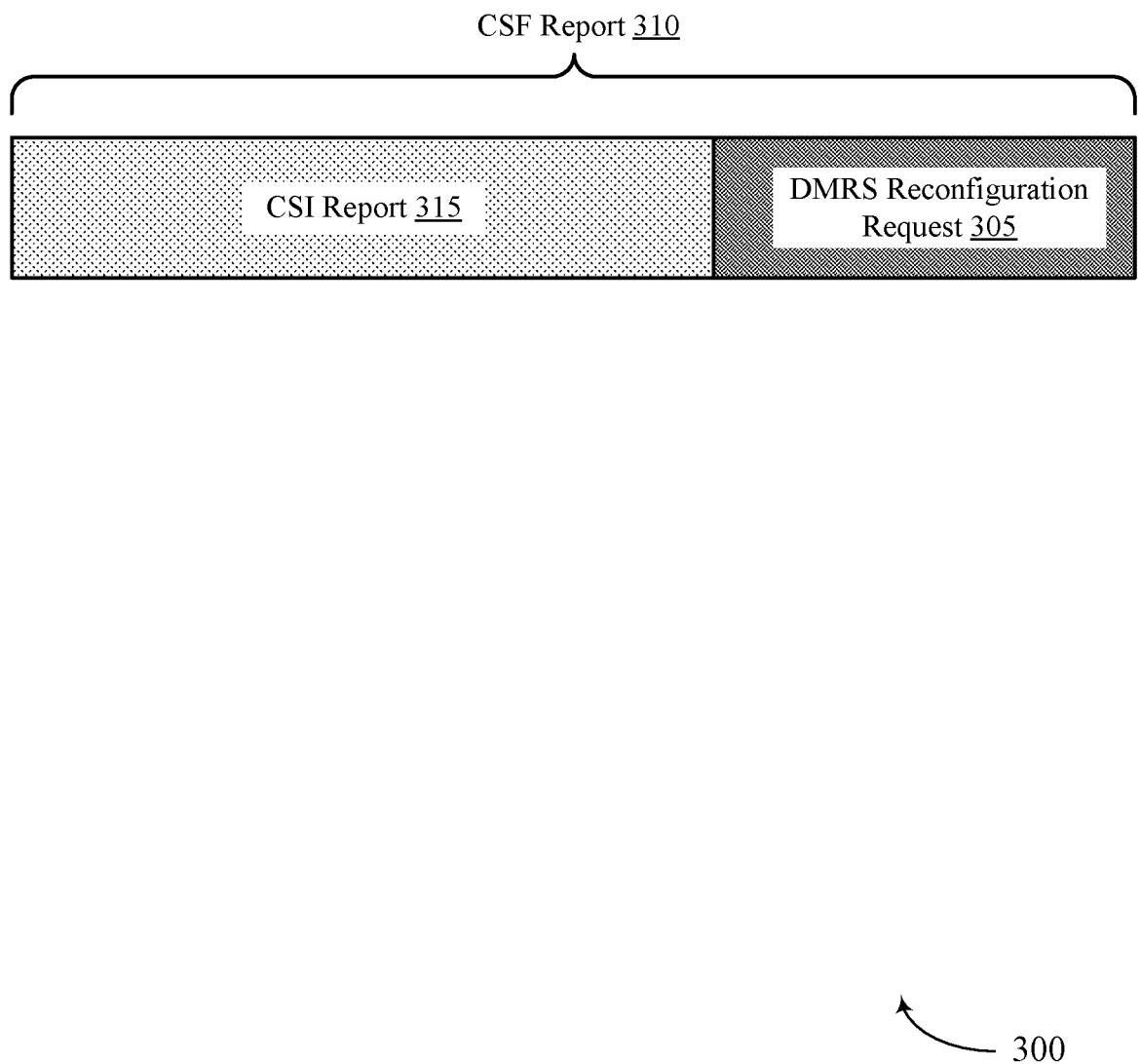
FIG. 3 illustrates an example of a CSF report design 300 that supports two step reporting procedure for DMRS configuration adjustment in accordance with aspects of the present disclosure.

FIG. 3 illustrates an example of a CSF report design 300 that supports two step reporting procedure for DMRS configuration adjustment in accordance with aspects of the present disclosure. In some examples, CSF report design 300 may implement aspects of wireless communication system 100. As described in FIG. 2, a UE may transmit, to a base station, DMRS reconfiguration request 305. In some examples, DMRS reconfiguration request 305 may trigger the base station to schedule the UE with an uplink transmission, where the uplink transmission includes a DMRS configuration report (e.g., joint DMRS and CSF report) which indicates one or more DMRS configurations selected by the UE and their associated CQI values. The base station may select a DMRS based on the DMRS configuration report and use one or more DMRS configurations for PDSCH transmissions to the UE according to the selected report.

In some examples, DMRS reconfiguration request 305 may be an example of a one bit indication. The value of the bit may be set to 1 or 0. A bit set to the value of 1 may trigger the base station to schedule the UE with the uplink transmission (e.g., DMRS configuration report) whereas a bit set to the value of 0 may indicate that a DMRS configuration change is not needed. The bit may be set to 1 if a condition is satisfied and the bit may be set to a value of 0 if the condition is not satisfied. As described with reference to FIG. 2, DMRS configuration change request may be included within periodic CSF report 310. In such example, the bit may be set to a value of 1 if the CQI values associated with the UE selected DMRS configuration increases at least one index in CQI value over the currently used DMRS configuration derived based on CSI reference resource slot). In the case that the CQI value associated with the UE selected DMRS configuration is at not least one index above the recently used DMRS configuration, the bit may be set to 0. Additionally or alternatively, if the UE selected DMRS configuration provides an overhead reduction or spectral efficiency improvement over a threshold when compared to the currently used DMRS configuration, the bit may be set to 1. In the case that the UE selected DMRS configuration may not provide an overhead reduction or spectral efficiency improvement over threshold compared to the recently used representative DMRS configuration (from CSI reference resource slot), the bit may be set to 0.

CSF report 310 may also include CSI report 315. CSI report 315 may be an example of any format of an existing LA CSI report and may include any combination of RI, PMI, or CQI reporting.

Figure 4:
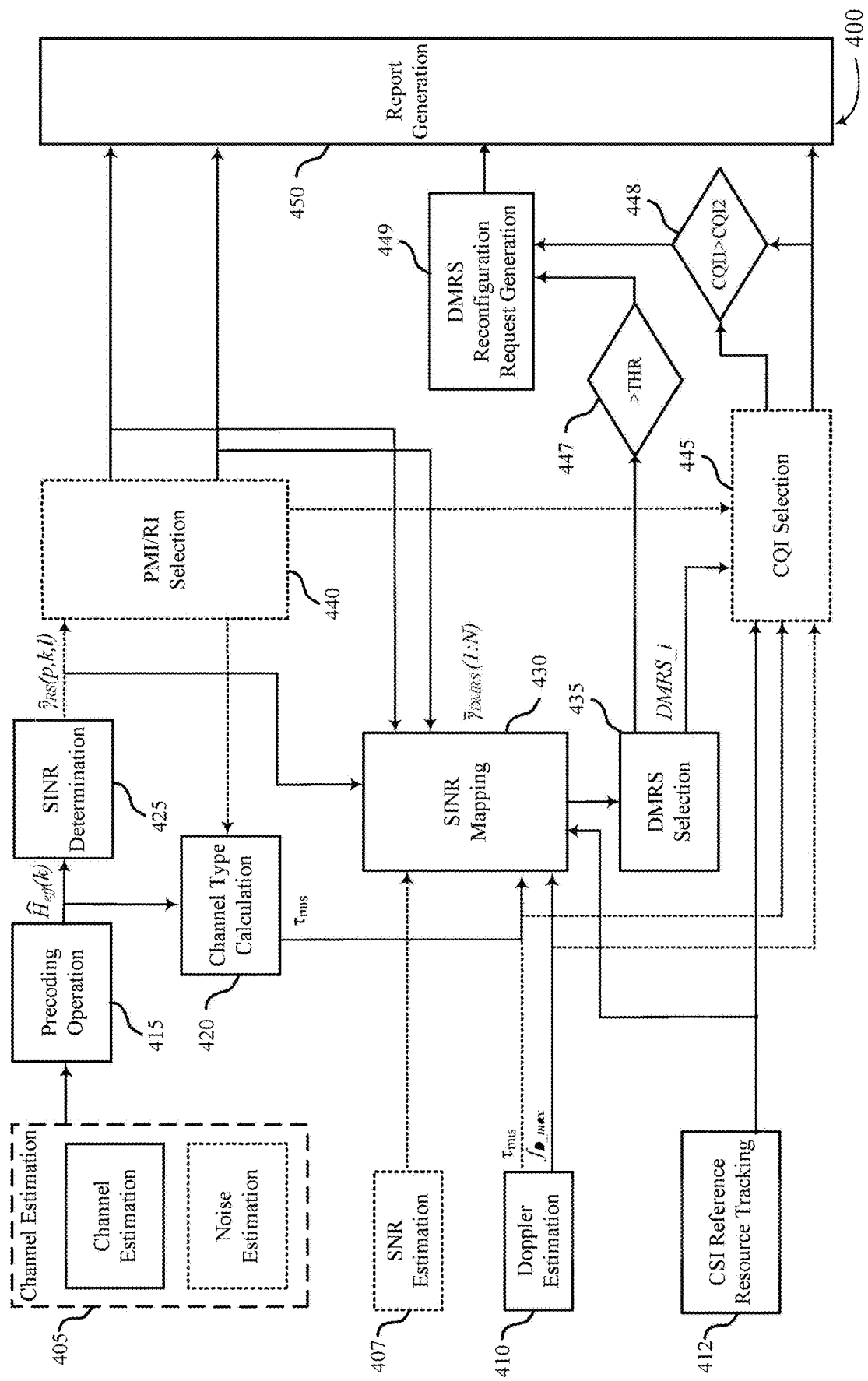
FIG. 4 illustrates an example of flowchart that supports two step reporting procedure for DMRS configuration adjustment in accordance with aspects of the present disclosure.

FIG. 4 illustrates an example of a flow chart 400 that supports two step reporting procedure for DMRS configuration adjustment in accordance with aspects of the present disclosure. In some examples, flow chart 400 may implement aspects of wireless communications system 100, wireless communications system 200, and CSF report design 300. In some examples, a base station may configure a UE with a list of all possible DMRS configurations or a list of relevant DMRS configurations to be addressed for DMRS configuration selection. When channel conditions change constituting a new DMRS configuration, the UE may transmit a DMRS reconfiguration request to the base station and the base station may schedule the UE with a DMRS configuration report (e.g., a joint DMRS and CSF report) including one or more selected DMRS configurations reporting. In some examples, the DMRS reconfiguration request may be transmitted as part of a periodic CSF report. Process 400 illustrates an exemplary collection of operations performed to support DMRS configuration change request determination as part of periodic CSF evaluation.

One skilled in the art would understand that one or more of the operations described in flow chart 400 may be performed earlier or later in the process, omitted, replaced, supplemented, or any combination thereof. Also, additional operations described herein that are not included in process flow 400 may be included.

At block 405, a wireless device (e.g., UE) may obtain an estimate of a channel between a transmitting device and the receiving device. Estimating the channel may include an estimation of the channel based on a reference signal (e.g., based on CSI-RS). Estimating the channel may also include an estimation of a noise component of channel based on an interference management resource (e.g., based on a CSI-IM resource).

At block 407, the wireless device may estimate an input SNR for the channel. The wireless device may estimate the input SNR to assist in post-processing SINR mapping as an alternative to using thermal noise and interference variance estimated in block 405.

At block 410, the wireless device may obtain an estimate of a Doppler frequency of the channel. The wireless device may estimate the Doppler frequency based on a received reference signal. For example, if the wireless device is a UE, the wireless device may estimate the Doppler frequency for the downlink channel based on a DMRS or a tracking reference signal (TRS). In some cases, the wireless device may also determine a delay spread based on the received reference signal (e.g., the DMRS or TRS).

At block 412, the wireless device may implement CSI reference resources tracking. That is, the wireless device may derive the DMRS configuration from a CSI reference resource slot (e.g., recently used DMRS configuration). In some examples, the DMRS configuration is addressed in terms of generic DMRS related parameters (e.g., time density, frequency density, and boosting). The wireless device may track a list of DMRS parameters based on CSI reference resource for each periodic CSF report evaluation.

At block 415, the wireless device may generate one or more effective channel matrices based on different combinations of the tested precoding matrices and rank hypothesis. The wireless device may generate one or more effective channel matrices based on applying the different combinations of precoding matrices and rank hypothesis to the channel estimate determined during the channel estimation operation.

At block 420, the wireless device may classify the channel based on one or more of the effective channel estimates obtained after applying the tested precoding operation—e.g., the channel may be classified in terms of some frequency selectiveness metric (e.g., frequency domain correlation of the channel, delay spread, power delay profile and etc.). The wireless device may also determine a delay spread for the channel based on the effective channel estimates. In some examples, the delay spread is determined for an effective channel estimate that corresponds to a precoding matrix and rank that have been selected for the channel to optimize link efficiency.

At block 425, the wireless device may determine one or more post-processing signal quality ratios (e.g., SNR or SINR) based on the effective channel matrices obtained after applying a precoding operation. In some cases, the precoding operation may be omitted—e.g., if a received reference signal is already precoded. In some cases, the wireless device may determine, for each stream l, each resource element k, and each tested precoding matrix p, a signal quality ratio $\hat{\gamma}_{RS}(p, k, l)$.

At block 430, the wireless device may execute a mapping from an average SINR computed for a received reference signal (e.g., a CSI-RS) to multiple average SINRs estimated for a set of DMRS configurations (e.g., a network configured list of DMRS configurations) and the representative currently used DMRS configuration derived at block 412. The estimated SINRs may be represented as $\bar{\gamma}_{DNRS}(1:N)$. The wireless device may identify a mapping based on an indication of a first set of characteristics for the channel (e.g., a combination of a delay spread $\tau_{rms}$, Doppler frequency $f_{D\_max}$, and/or noise variance $\hat{\sigma}_{IM}^2$ if the wireless device is a UE, or equivalently a combination of a delay spread $\tau_{rms}$, Doppler frequency $f_{D\_max}$, and/or reception SNR) and a configuration of the addressed reference signal that can be determined in generic way by a combination of a temporal spacing, frequency spacing, and power boosting parameters. The Doppler frequency may be determined based on the Doppler estimation. And the noise variance may be determined based on the noise estimation.

Before executing the mapping, the SINRs computed for the received reference signal ($\hat{\gamma}_{RS}(p, k, l)$) may be averaged some way across the set of resource elements k for each stream l and precoding matrix p. To compute the SINR for the received reference signal, the wireless device may average a set of SINRs computed for different resource elements, on a per stream basis and in accordance with a selected precoding matrix and rank. In some cases, an indication of the precoding matrix and rank is provided to the SINR mapping operation based on a prior or concurrent determination of the precoding matrix and rank. The SINR mapping operation may use the indicated precoding matrix and rank to determine which version of SINR estimates determined at block 425 to use for the SINR mapping.

At block 435, the wireless device may select one or more of the tested DMRS configurations. The wireless device may select the DMRS configuration of the network configured list of DMRS configurations that maximizes a communication metric for the channel, such as effective spectral efficiency. That is, the wireless device may select the DMRS configuration, DMRS_i, that yields a larger value for the communication metric than the other DMRS configurations. In some examples, DMRS configurations may be evaluated and selected per subband, TB, or CDM group.

At block 440, the wireless device may determine a precoding matrix and rank that maximize the spectral efficiency of the channel among the tested rank and precoding options—e.g., based on the determined signal quality ratios. As described herein, the selected precoding matrix and rank may be used by the SINR mapping operation to determine an average estimated SINR for a received reference signal that corresponds to a selected precoding matrix and rank. The wireless device may also determine a spectral efficiency for the channel based on the selected precoding matrix and rank selection. In some cases, the precoding matrix and rank selection operation is not performed.

At block 445, the wireless device may determine a value for a CQI associated with the selected DMRS configuration and the DMRS configuration followed from the CSI reference resource (e.g., recently used DMRS configuration). The CQI determination may be also based on the delay spread $\tau_{rms}$, and Doppler frequency $f_{D\_max}$. The CQI determination may also be based on an indication of spectral efficiency for the channel determined during the precoding matrix and rank selection operation. In some cases, the wireless device determines a value for the CQI that is associated with an modulation and coding scheme (MCS) that is optimized for the selected DMRS configuration and channel conditions.

At block 447, the wireless device may compare the spectral efficiency and/or overhead associated with the selected DMRS configuration and the DMRS configuration from the CSI reference resource. In some examples, the wireless device may calculate the reduction in overhead or improvement in the associated spectral efficiency by comparing the overhead associated with the selected DMRS configuration and the recently used DMRS configuration and determine if the overhead reduction value or spectral efficiency improvement is above a threshold. In some examples, the threshold may be preconfigured at the wireless device (e.g., if the wireless device is a UE).

At block 448, the wireless device may compare the CQI values determined at block 445. For example, the wireless device may compare the CQI value associated with the selected DMRS configuration with the CQI value associated with the DMRS configuration from the CSI reference resource.

At block 449, the wireless device may generate a DMRS reconfiguration request. In some examples, the DMRS reconfiguration request may indicate to the transmitter that a new DMRS configuration may be beneficial due to a channel condition and reception conditions changes. In some examples, the DMRS reconfiguration request may include a one-bit indication, where a bit value of 1 triggers the BS to schedule a joint DMRS+CSF report for the UE to obtain a report of one or more selected DMRS configurations and the corresponding to the CQIs and a bit value of 0 indicates that a change in DMRS configuration is not needed. If the overhead reduction associated with the selected DMRS configuration compared to the currently used DMRS configuration is determined to be above the threshold (or similarly spectral efficiency improvement above the threshold), at block 447, the wireless device may set the bit value to 1. Alternatively, if the overhead reduction or spectral efficiency improvement associated with the selected DMRS configuration compared to the currently used DMRS configuration is not determined to be above the threshold, at block 447, the wireless device may set the bit value to 0. Additionally or alternatively, if the CQI value associated with the selected DMRS configuration is above the CQI value associated with the currently used DMRS, at block 448, the wireless device may set the bit value to 1. Alternatively, if the CQI value associated with the selected DMRS configuration is below the CQI value associated with the currently used DMRS, at block 448, the wireless device may set the bit value to 0.

At block 450, the wireless device may generate a report (e.g., CSF report if the wireless device is a UE) that includes the DMRS reconfiguration request. The report may also include a CQI value associated with the recently used DMRS configuration. In some examples, generating the report includes generating a CSI report that includes a PMI, RI, CQI associated with the currently used DMRS configuration, and DMRS configuration indicator (DMI) of the selected DMRS configuration.

As described with reference to FIG. 2, if the DMRS reconfiguration request indicates a change in DMRS configuration, the transmitting device (e.g., a base station) may schedule the receiving device (e.g., a UE) to transmit a DMRS configuration report (e.g., a joint DMRS and CSF report). The DMRS configuration report may include a set of selected DMRS configuration and CQI bundles. In some examples, the DMRS configuration report may be transmitted as part of an extended aperiodic CSF report. The transmitting device may receive the DMRS configuration report and transmit reference signals as a part of the related data allocation to the receiving device based at least in part on the DMRS and CQI bundles included in the DMRS configuration report (e.g., a joint DMRS and CSF report).

Figure 5:
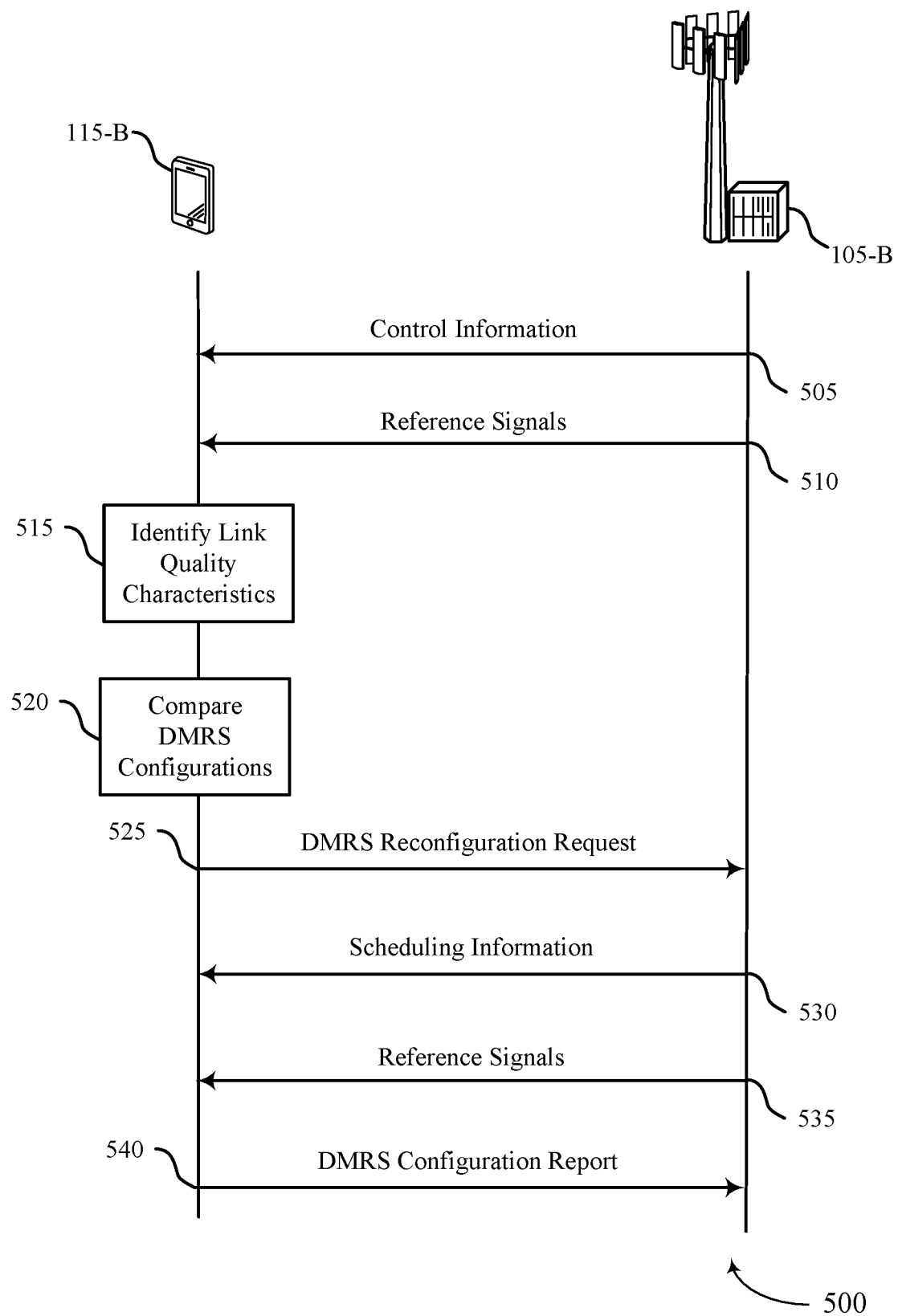
FIG. 5 illustrates an example of a process flow that supports two step reporting procedure for DMRS configuration adjustment in accordance with aspects of the present disclosure.

FIG. 5 illustrates an example of a process flow 500 that supports two step reporting procedure for DMRS configuration adjustment in accordance with aspects of the present disclosure. In some examples, process flow 500 may implement aspects of wireless communication system 100, wireless communication system 200, CSF report design 300, and process flow 400. For example, the process flow 500 may include UE 115-b and base station 105-b which may be examples of a UE 115 and a base station 105 as described with reference to FIGS. 2 through 4. In some examples, UE 115-b may transmit a DMRS reconfiguration change request to the network indicating that a channel condition has changed and a new DMRS configuration different compared to what is currently used may be beneficial. In response, base station 105-b may schedule UE 115-b with an uplink transmission (e.g., configuration selection report) which may include DMRS configuration and CQI bundles, where the DMRS configurations are selected by UE 115-*b* based on the corresponding spectral efficiency metrics comparison UE 115-*b* and base station 105-*b* may implement one or more techniques described herein. Alternative examples of the following may be implemented, where steps are performed in a different order than described or are not performed at all. In some cases, steps may include additional features not mentioned below, or further may be added.

At 505, base station 105-*b* may transmit control information to UE 115-*b*. The control information may include a list of DMRS configurations from a plurality of DMRS configurations that UE 115-*b* is capable to support.

At 510, base station 105-*b* may transmit one or more reference signals to UE 115-*b*. The one or more reference signals may be a CSI-RS, a DMRS, or a TRS.

At 515, UE 115-*a* may determine link quality characteristics associated with the list of DMRS configurations. For examples, UE 115-*b* may use the parameters of the one or more reference signals and a set of channel characteristics (e.g., Doppler frequency, delay spread, SNR) to estimate multiple link quality characteristics (e.g., post processing SINR) that correspond to the DMRS configurations of the list. UE 115-*b* may utilize the channel quality characteristics to select one DMRS configuration that maximizes the spectral efficiency metric. UE 115-*a* may also determine a CQI value corresponding to the currently used DMRS configuration determined based on CSI reference resource slot) and the selected DMRS configuration. The CQI value may be determined based among the rest on the delay spread and Doppler frequency estimates for the channel.

At 520, UE 115-*b* may compare the most currently used DMRS configuration with the selected DMRS configuration. For example, UE 115-*a* may compare the DMRS configurations based on link quality characteristics, signal overhead, link spectral efficiency, CQI values, or a combination thereof.

At 525, UE 115-*b* may transmit a DMRS reconfiguration request to base station 105-*b*. The DMRS reconfiguration request may be an example of a one bit indication, where a bit of value of one indicating a UE request/preference for DMRS configuration change and a bit values of zero indicate no UE preference for a DMRS configuration change. The bit may be set to a value of one if a condition is met. For example, if spectral efficiency associated with the selected DMRS configuration exceeds the spectral efficiency associated with currently used DMRS configuration, the bit may be set to one. Additionally or alternatively, if the CQI value associated with selected DMRS configuration increases at least one CQI index above the CQI value associated with the currently used DMRS configuration, the bit may be set to one. Additionally or alternatively, if the overhead associated with the selected DMRS is less than the overhead threshold when compared to the overhead associated with the current DMRS configuration the bit may be set to one. If one or more of these conditions are met, the bit may be set to a value of one. In some example, DMRS reconfiguration request may be transmitted to base station 105-*b* as a part of a periodic CSF report. In the event that the DMRS reconfiguration request indicates a UE preference for a DMRS configuration change (e.g., bit value of one), base station 105-*b* may schedule UE 115-*b* with an uplink transmission (e.g., an extended aperiodic DMRS configuration and CSF report). Alternatively, the uplink transmission (e.g., joint DMRS and CSF report) may be triggered proactively to figure out the initial DMRS configuration and the corresponding to it CSF/CQI before the first periodic CSF report that may convey only DMRS reconfiguration request bit in addition to CSF evaluated assuming the current DMRS configuration traced based on CSI reference resource slot. The same can be done for any other scenario that may involve (with high probability) some change in channel and reception conditions and the corresponding change in DMRS configuration preference (e.g., after long DRX, after beam switch, after major reconfiguration).

At 530, base station 105-*b* may transmit scheduling information to UE 115-*b*. The scheduling information may indicate resources on which to transmit the DMRS configuration report (e.g., a joint DMRS and CSF report).

At 535, base station 105-*b* may transmit one or more reference signals to UE 115-*b*. The one or more reference signals may be a CSI-RS, DMRS, or a TRS.

At 540, UE 115-*b* may transmit a DMRS configuration report (e.g., a joint DMRS and CSF report) to base station 105-*b*. UE 115-*a* may compare a network configured list of DMRS configurations and select one or more DMRS configurations based on spectral efficiency, link quality characteristics, etc. UE 115-*b* may also determine a corresponding CQI values associated with the one or more selected DMRS configurations. The DMRS configuration report may indicate one or more selected DMRS configurations along with their associated CQI values (e.g., DMRS configuration and CQI bundles). The base station 105-*b* may use the DMRS configuration report to determine a DMRS configuration for subsequent communications with UE 115-*b*. In some examples, DMRS configuration report may be included in an extended aperiodic CSF report. The list of DMRS configurations to be addressed in DMRS configuration selection and reporting for the scheduled extended AP report for joint DMRS and CSF reporting may be dynamically adjusted by the network through CSI trigger state configuration or reconfiguration (and/or complimentary activation and reactivation) and this list of DMRS configurations may be the same, a subset, or a modified list compared to what was configured at 505 (e.g., for periodic CSF report with DMRS reconfiguration request indication). Alternatively or additionally, the DMRS configuration report (e.g., extended aperiodic report for joint DMRS and CSF reporting) may include a DMRS configuration and CQI bundles per SB, TB, or CDM group.

Figure 6:
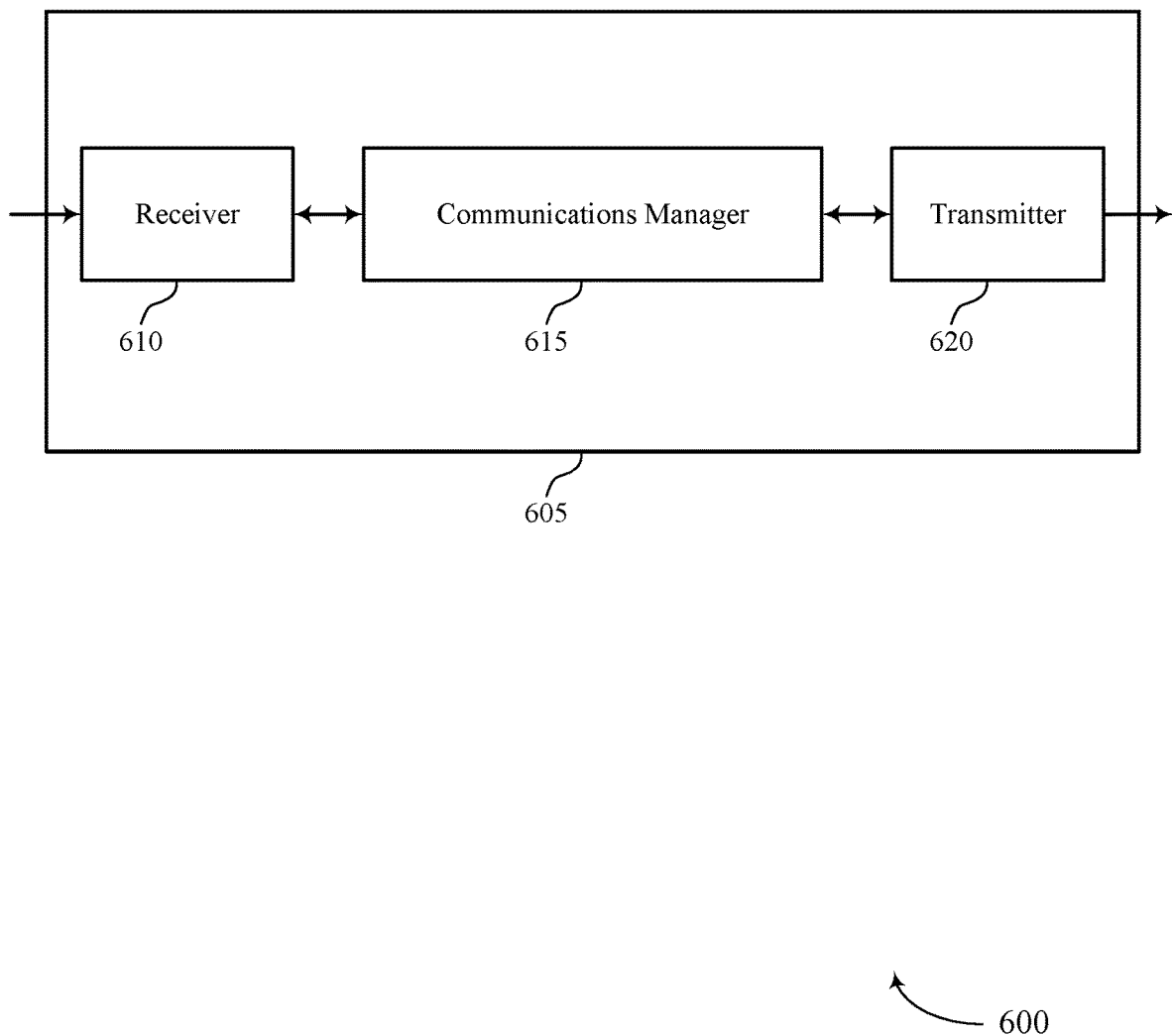
FIGS. 6 and 7 show block diagrams of devices that support two step reporting procedure for DMRS configuration adjustment in accordance with aspects of the present disclosure.

FIG. 6 shows a block diagram 600 of a device 605 that supports two step reporting procedure for DMRS configuration adjustment in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to two step reporting procedure for DMRS configuration adjustment, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, control information indicating a subset of DMRS configurations to be addressed for DMRS configuration selection and reporting, the subset of a set of DMRS configurations supported by the UE, identify a set of link quality characteristics for a channel, the set of link quality characteristics corresponding to the subset of DMRS configurations, determine a UE preference for a configuration change from a first DMRS configuration (e.g., the currently used) to a second DMRS configuration included in the subset based on the set of the corresponding spectral efficiency metrics, the first DMRS configuration determined based on a CSI reference resource (representative of the currently used DMRS configuration), the second DMRS configuration allowing a DMRS overhead reduction, a corresponding link spectral efficiency improvement, a corresponding estimated link quality characteristic improvement an increase in a determined CQI, or any combination thereof, relative to the first DMRS configuration, and transmit, to the base station, a report including an indication of a UE request for the configuration change based on the UE preference. The communications manager 615 may be an example of aspects of the communications manager 910 described herein.

The actions performed by the communications manager 615 as described herein may be implemented to realize one or more potential advantages. For example, transmitting the DMRS reconfiguration request may allow device 605 to indicate a request for a DMRS configuration change when it is needed without explicitly and repetitively reporting of the preferred DMRS configuration. That is, device 605 may only be scheduled to report a set of selected DMRS configurations in the event that a second DMRS configuration is determined to be more suitable for current channel conditions (e.g., maximization of link efficiency) as compared to a first DMRS configuration.

Additionally, transmitting the DMRS reconfiguration request may reduce processing at device 605 when compared to periodically reporting a selected DMRS configuration. That is, device 605 may not include an indication of a DMRS configuration in in the DMRS reconfiguration report, but instead a one-bit indication. Constructing a DMRS reconfiguration including a one-bit indication when compared to constructing a DMRS reconfiguration request with an indication of a selected DMRS configuration may reduce processing at device 605.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
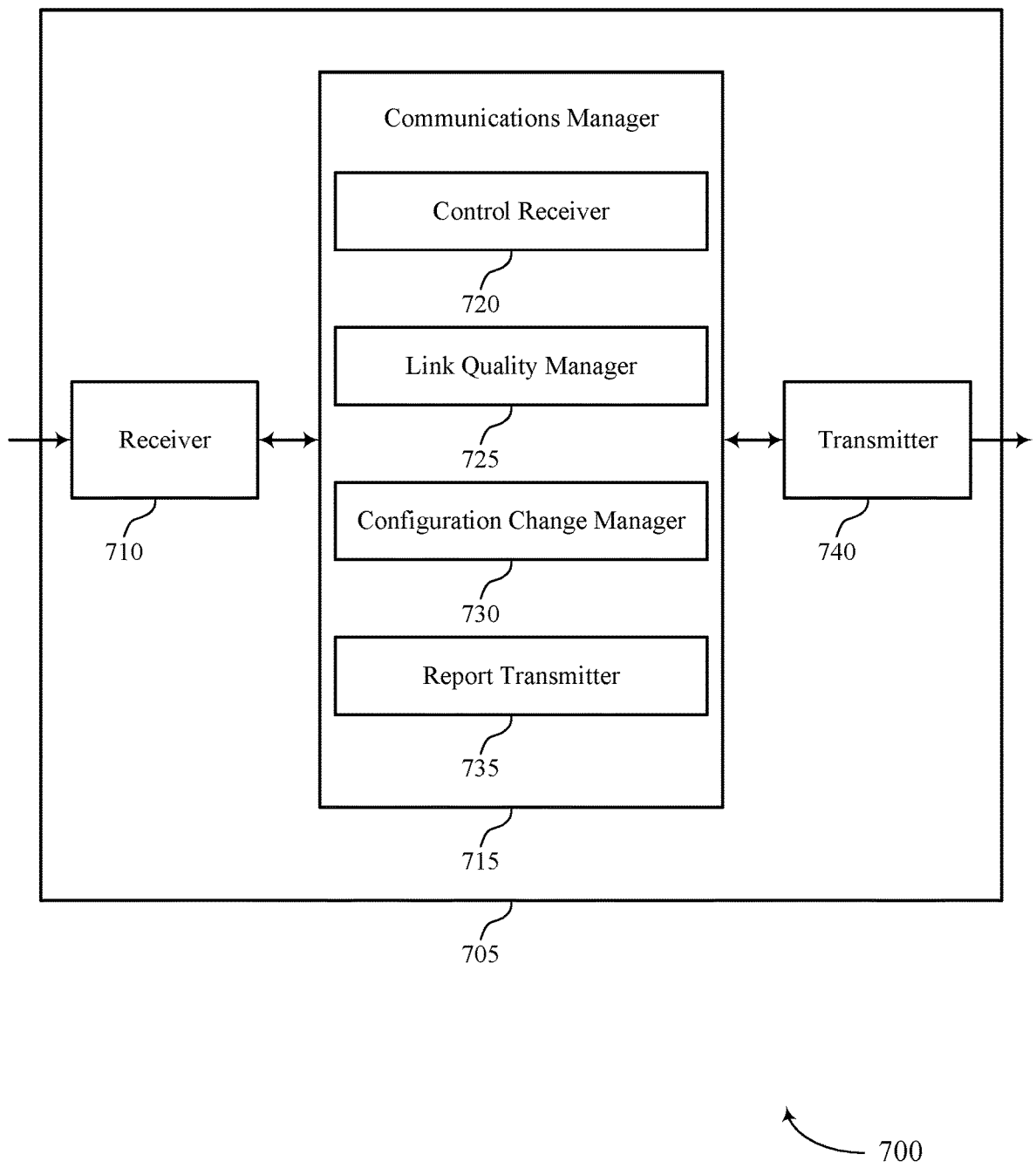

FIG. 7 shows a block diagram 700 of a device 705 that supports two step reporting procedure for DMRS configuration adjustment in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to two step reporting procedure for DMRS configuration adjustment, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a control receiver 720, a link quality manager 725, a configuration change manager 730, and a report transmitter 735. The communications manager 715 may be an example of aspects of the communications manager 910 described herein.

The control receiver 720 may receive, from a base station, control information indicating a subset of DMRS configurations to be addressed for DMRS configuration selection and reporting, the subset of a set of DMRS configurations supported by the UE.

The link quality manager 725 may identify a set of link quality characteristics for a channel, the set of link quality characteristics corresponding to the subset of DMRS configurations.

The configuration change manager 730 may determine a UE preference for a configuration change from a first DMRS configuration (e.g., the currently used) to a second DMRS configuration included in the subset based on the set of the corresponding spectral efficiency metrics, the first DMRS configuration determined based on a CSI reference resource (representative of the currently used DMRS configuration), the second DMRS configuration allowing a DMRS overhead reduction, a corresponding link spectral efficiency improvement, a corresponding estimated link quality characteristic improvement an increase in a determined CQI, or any combination thereof, relative to the first DMRS configuration The report transmitter 735 may transmit, to the base station, a report including an indication of a UE request for the configuration change based on the UE preference.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
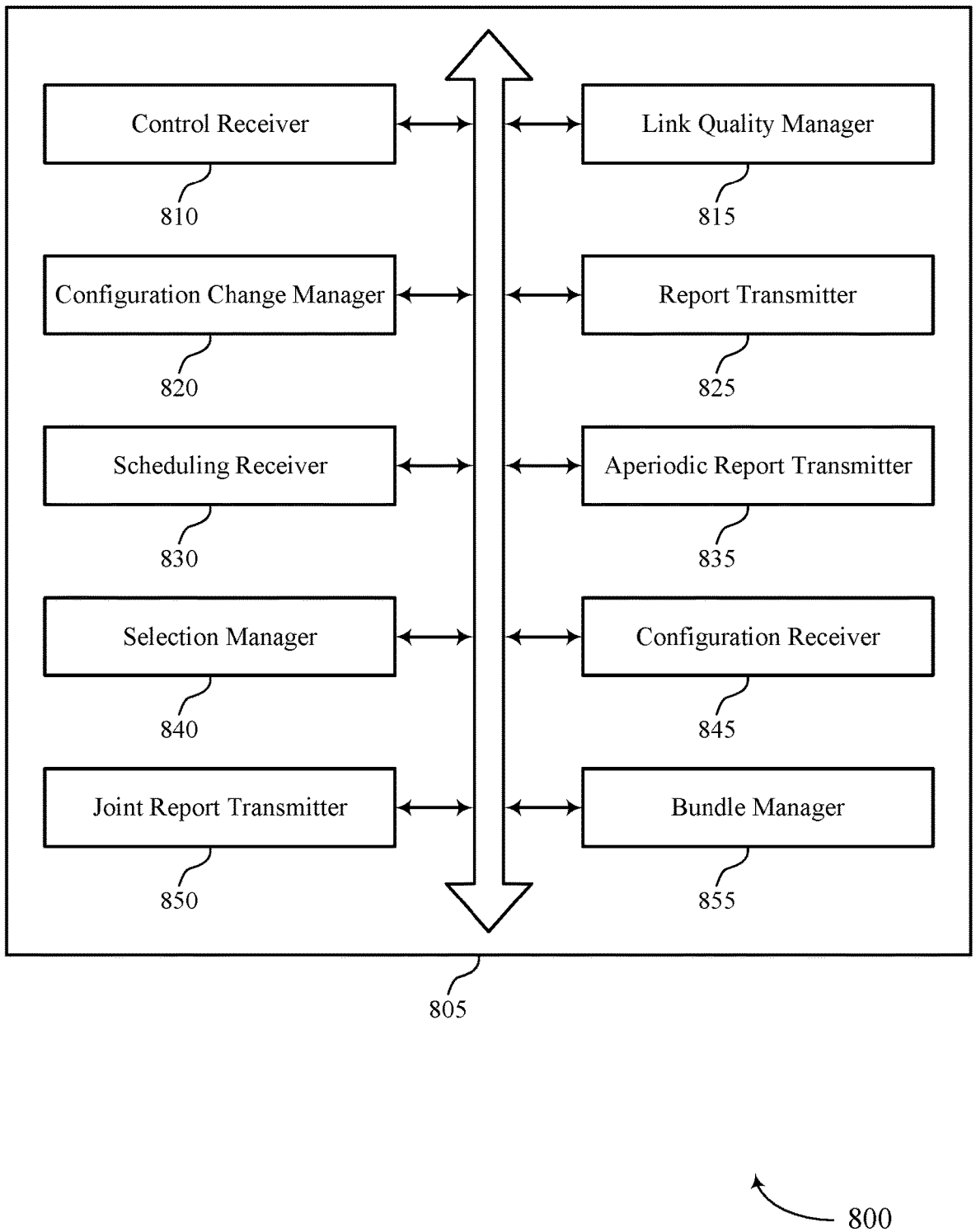
FIG. 8 shows a block diagram of a communications manager that supports two step reporting procedure for DMRS configuration adjustment in accordance with aspects of the present disclosure.

FIG. 8 shows a block diagram 800 of a communications manager 805 that supports two step reporting procedure for DMRS configuration adjustment in accordance with aspects of the present disclosure. The communications manager 805 may be an example of aspects of a communications manager 615, a communications manager 715, or a communications manager 910 described herein. The communications manager 805 may include a control receiver 810, a link quality manager 815, a configuration change manager 820, a report transmitter 825, a scheduling receiver 830, an aperiodic report transmitter 835, a selection manager 840, a configuration receiver 845, a joint report transmitter 850, and a bundle manager 855. Each of these modules may communicate, directly or indirectly, with one another (e.g., via one or more buses).

The control receiver 810 may receive, from a base station, control information indicating a subset of DMRS configurations to be addressed for DMRS configuration selection and reporting, the subset of a set of DMRS configurations supported by the UE.

The link quality manager 815 may identify a set of link quality characteristics for a channel, the set of link quality characteristics corresponding to the subset of DMRS configurations.

The configuration change manager 820 may determine a UE preference for a configuration change from a first DMRS configuration (e.g., the currently used) to a second DMRS configuration included in the subset based on the set of the corresponding spectral efficiency metrics, the first DMRS configuration determined based on a CSI reference resource (representative of the currently used DMRS configuration), the second DMRS configuration allowing a DMRS overhead reduction, a corresponding link spectral efficiency improvement, a corresponding estimated link quality characteristic improvement an increase in a determined CQI, or any combination thereof, relative to the first DMRS configuration.

In some examples, the configuration change manager 820 may determine that the DMRS overhead reduction, the estimated link quality characteristic improvement, the link spectral efficiency improvement, or any combination thereof, associated with the second DMRS configuration exceeds a threshold.

In some examples, the configuration change manager 820 may determine a configuration change request bit based on the DMRS overhead reduction, the estimated link spectral efficiency, the estimated link quality characteristic, or any combination thereof exceeding the threshold.

In some examples, the configuration change manager 820 may determine that the second DMRS configuration maintains at least a same CQI as the first DMRS configuration based on the set of spectral efficiency metrics or link quality characteristics.

In some examples, the configuration change manager 820 may determine a configuration change request bit based on the second DMRS configuration maintaining at least the same CQI as the first DMRS configuration.

In some examples, the configuration change manager 820 may determine a CQI index of the second DMRS configuration to be greater than a CQI index of the first DMRS configuration based on the corresponding spectral efficiency metrics or the set of link quality characteristics.

In some examples, the configuration change manager 820 may determine a configuration change request bit based on the CQI index of the second DMRS configuration being greater than the CQI index of the first DMRS configuration.

The report transmitter 825 may transmit, to the base station, a report including an indication of a UE request for the configuration change based on the UE preference.

In some examples, the report transmitter 825 may transmit a periodic CSF report including a CRI, a RI, a PMI, a CQI, a SLI, or any combination thereof.

In some examples, the report transmitter 825 may transmit, in an uplink message, an indicator within a demodulation configuration change request field that indicates the UE request for the configuration change. In some cases, the indicator is a one bit indicator.

The scheduling receiver 830 may receive, from the base station and prior to transmitting an initial periodic CSF report, a control message scheduling an aperiodic report for joint DMRS and CSF reporting.

In some examples, the scheduling receiver 830 may receive the message after completion of a long discontinuous reception cycle duration, a beam switch procedure, a reconfiguration of the UE, or any combination thereof.

In some examples, the scheduling receiver 830 may receive, from the base station and in response to the UE request for the configuration change, a message scheduling an aperiodic extended report for joint DMRS and CSF reporting.

The aperiodic report transmitter 835 may transmit the aperiodic report that includes one or more DMRS configurations of the subset of DMRS configurations for selection and reporting and one or more corresponding CQIs or corresponding CSF in response to the control message.

In some cases, the aperiodic report includes a refreshed list of one or more bundles of a DMRS and corresponding CQIs selected by the UE or configured for reporting.

The selection manager 840 may select one or more of the subset of DMRS configurations based on the report configuration and associated with one or more scheduling scenarios and configured by the base station to be addressed by the aperiodic report, where the aperiodic report includes the one or more selected DMRS configurations from the configured subset and a corresponding one or more CQIs or CSF.

The configuration receiver 845 may receive, from the base station, a configuration for the aperiodic report, the configuration indicating a list of DMRS configurations to be addressed in the aperiodic report, where the one or more of the subset of the DMRS configurations are selected based on the configuration and where the one or more of the subset of the DMRS configurations are reported with corresponding CQIs or corresponding CSF.

The joint report transmitter 850 may transmit an extended joint DMRS and CSF report to the base station in response to the message.

In some cases, the extended joint DMRS and CSF report includes one or more bundles of a DMRS and a corresponding CQI, a joint subband DMRS and CSF report, a joint DMRS and CSF report per transport block or per code division multiplexing group, or any combination thereof.

The bundle manager 855 may determine each DMRS for the one or more reported bundles based on a configuration for the aperiodic report.

In some examples, the bundle manager 855 may determine respective CQIs for each DMRS of the one or more bundles.

Figure 9:
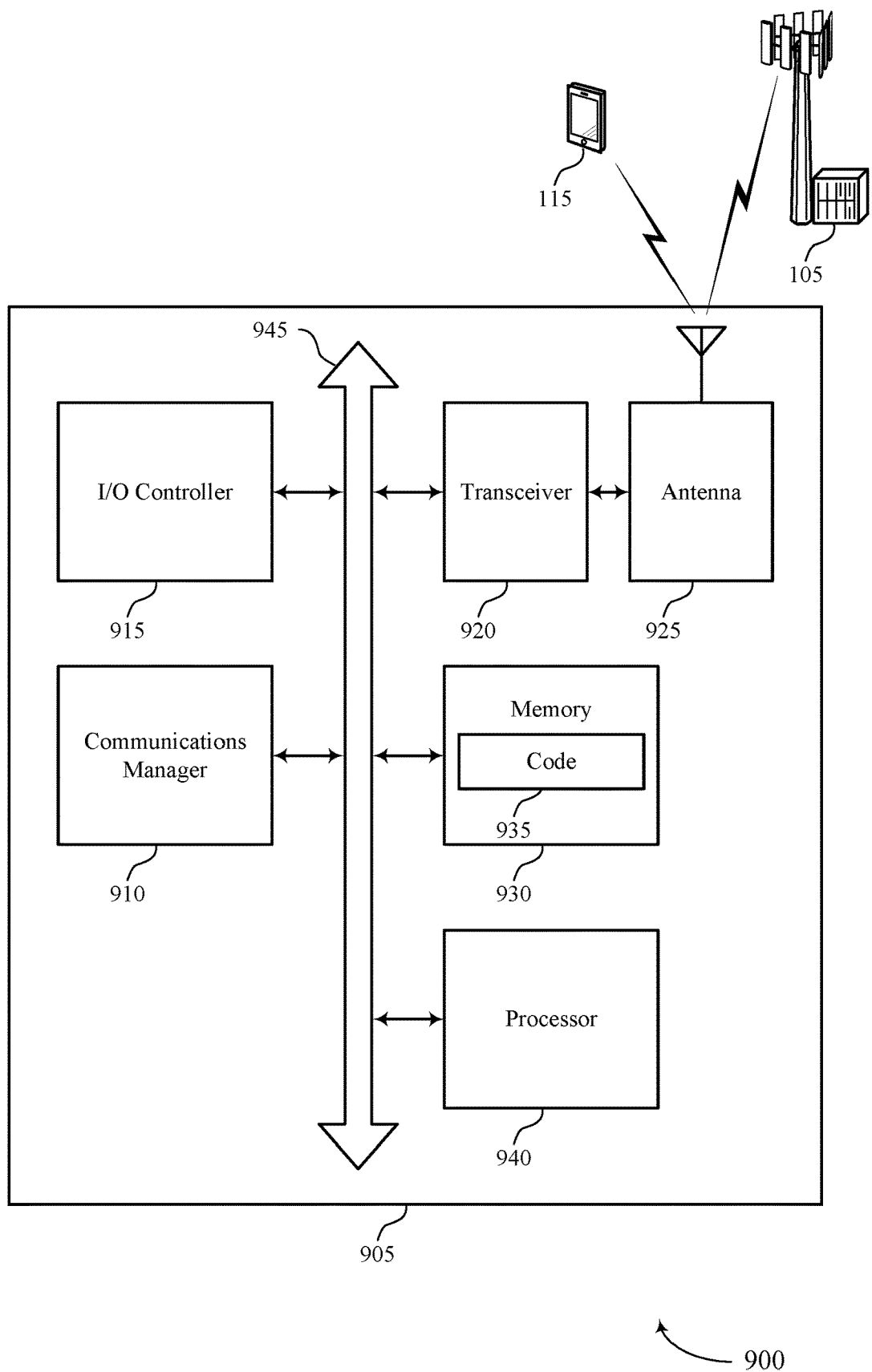
FIG. 9 shows a diagram of a system including a device that supports two step reporting procedure for DMRS configuration adjustment in accordance with aspects of the present disclosure.

FIG. 9 shows a diagram of a system 900 including a device 905 that supports two step reporting procedure for DMRS configuration adjustment in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, control information indicating a subset of DMRS configurations to be addressed for DMRS configuration selection and reporting, the subset of a set of DMRS configurations supported by the UE, identify a set of link quality characteristics for a channel, the set of link quality characteristics corresponding to the subset of DMRS configurations, determine a UE preference for a configuration change from a first DMRS configuration (e.g., the currently used DMRS configuration) to a second DMRS configuration included in the subset based on the set of link quality characteristics, the first DMRS configuration determined based on a CSI reference resource, the second DMRS configuration allowing a DMRS overhead reduction, a corresponding estimated link quality characteristic improvement, a corresponding link spectral efficiency improvement, an increase in a determined CQI, or any combination thereof, relative to the first DMRS configuration, and transmit, to the base station, a report including an indication of a UE request for the configuration change based on the UE preference.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting two step reporting procedure for DMRS configuration adjustment).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
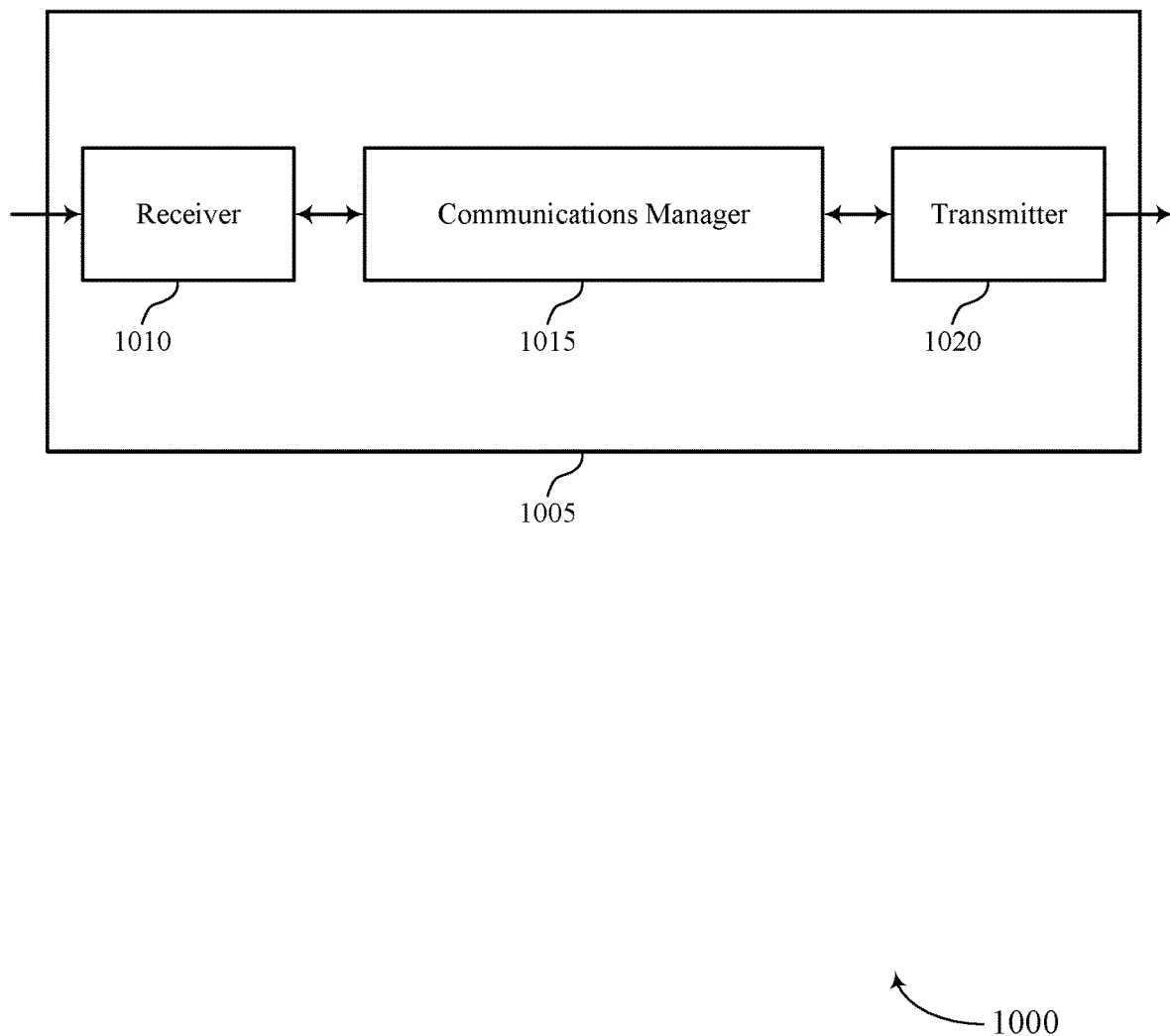
FIGS. 10 and 11 show block diagrams of devices that support two step reporting procedure for DMRS configuration adjustment in accordance with aspects of the present disclosure.

FIG. 10 shows a block diagram 1000 of a device 1005 that supports two step reporting procedure for DMRS configuration adjustment in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to two step reporting procedure for DMRS configuration adjustment, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a set of DMRS configurations supported by a UE served by the base station based on a capability of the UE, transmit, to the UE, control information indicating a subset of DMRS configurations of the set of DMRS configurations to be addressed for DMRS configuration selection and reporting, and receive, from the UE, a report including an indication of a UE request for a DMRS configuration change based on a set of link quality characteristics at the UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
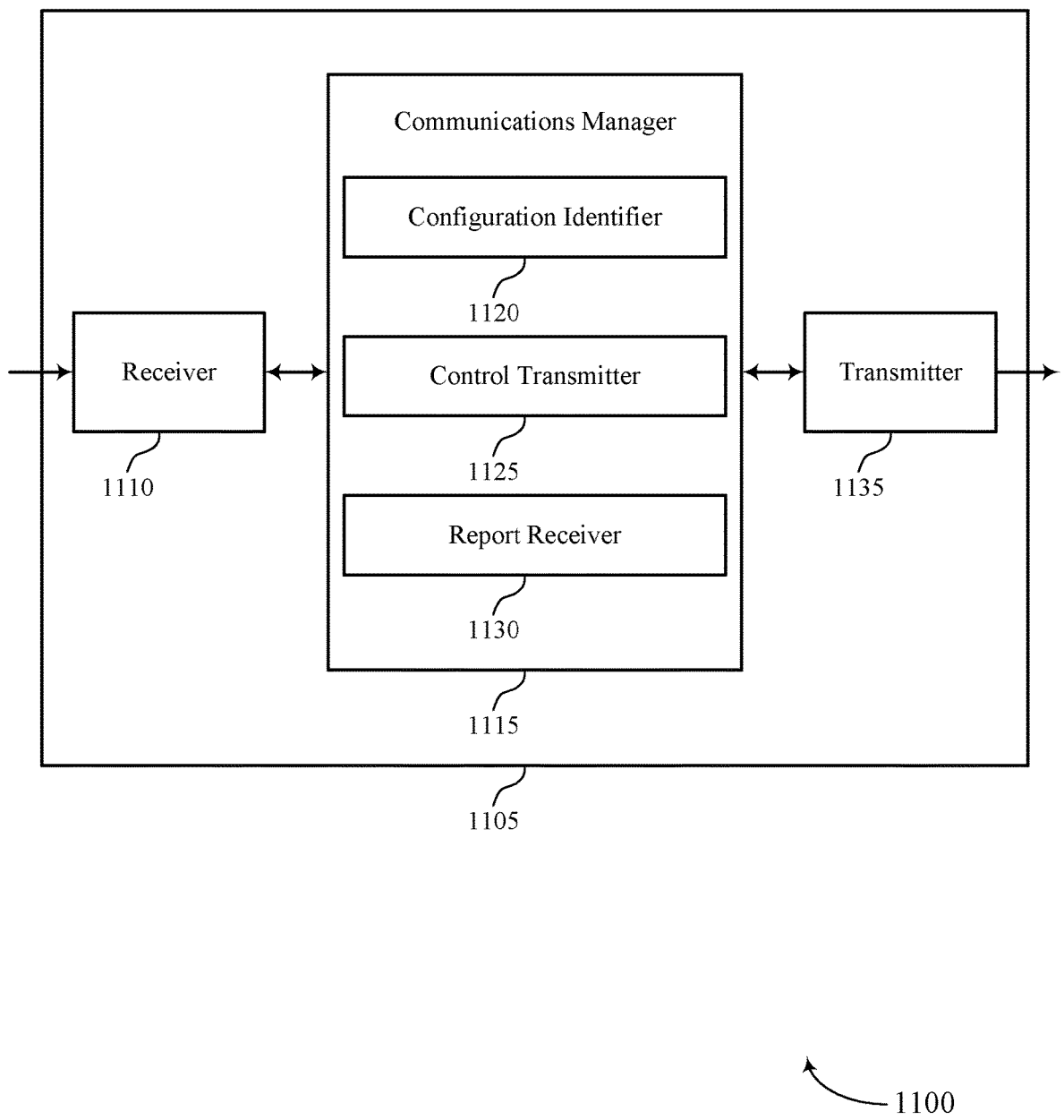

FIG. 11 shows a block diagram 1100 of a device 1105 that supports two step reporting procedure for DMRS configuration adjustment in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to two step reporting procedure for DMRS configuration adjustment, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configuration identifier 1120, a control transmitter 1125, and a report receiver 1130. The communications manager 1115 may be an example of aspects of the communications manager 1310 described herein.

The configuration identifier 1120 may identify a set of DMRS configurations supported by a UE served by the base station based on a capability of the UE.

The control transmitter 1125 may transmit, to the UE, control information indicating a subset of DMRS configurations of the set of DMRS configurations to be addressed for DMRS configuration selection and reporting.

The report receiver 1130 may receive, from the UE, a report including an indication of a UE request for a DMRS configuration change based on a set of link quality characteristics at the UE.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
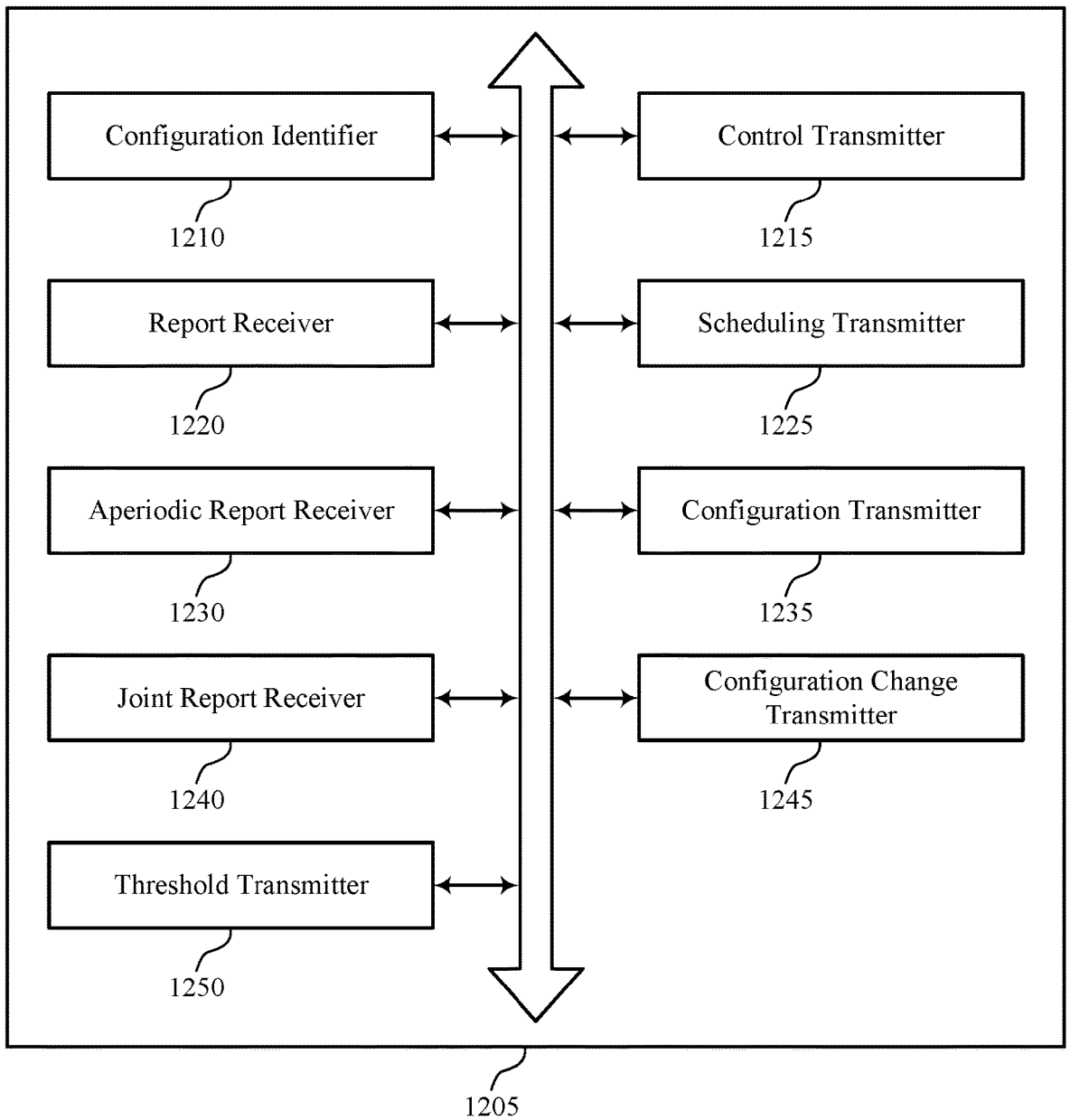
FIG. 12 shows a block diagram of a communications manager that supports two step reporting procedure for DMRS configuration adjustment in accordance with aspects of the present disclosure.

FIG. 12 shows a block diagram 1200 of a communications manager 1205 that supports two step reporting procedure for DMRS configuration adjustment in accordance with aspects of the present disclosure. The communications manager 1205 may be an example of aspects of a communications manager 1015, a communications manager 1115, or a communications manager 1310 described herein. The communications manager 1205 may include a configuration identifier 1210, a control transmitter 1215, a report receiver 1220, a scheduling transmitter 1225, an aperiodic report receiver 1230, a configuration transmitter 1235, a joint report receiver 1240, a configuration change transmitter 1245, and a threshold transmitter 1250. Each of these modules may communicate, directly or indirectly, with one another (e.g., via one or more buses).

The configuration identifier 1210 may identify a set of DMRS configurations supported by a UE served by the base station based on a capability of the UE.

The control transmitter 1215 may transmit, to the UE, control information indicating a subset of DMRS configurations of the set of DMRS configurations to be addressed for DMRS configuration selection and reporting.

The report receiver 1220 may receive, from the UE, a report including an indication of a UE request for a DMRS configuration change based on a set of link quality characteristics at the UE.

In some examples, the report receiver 1220 may receive a periodic CSF report including a CRI, a RI, a PMI, a CQI, a SLI, or any combination thereof.

In some examples, the report receiver 1220 may receive, in an uplink message, an indicator within a demodulation configuration change request field that indicates the UE request for the DMRS configuration change.

In some cases, the indicator is a one bit indicator.

In some cases, the second DMRS configuration allows a DMRS overhead reduction, a corresponding estimated link quality characteristic improvement, a corresponding link spectral efficiency improvement, an increase in a determined CQI, or any combination of thereof, relative to the first DMRS configuration by a threshold.

The scheduling transmitter 1225 may transmit, to the UE and prior to receiving an initial CSF report from the UE, a message scheduling an aperiodic report for joint DMRS and CSF reporting.

In some examples, the scheduling transmitter 1225 may transmit the message after completion of a long discontinuous reception cycle duration, a beam switch procedure, a reconfiguration of the UE, or any combination thereof.

In some examples, the scheduling transmitter 1225 may transmit, to the UE and in response to the UE report indicating the DMRS configuration change request, a message scheduling an aperiodic report for joint DMRS and CSF reporting.

The aperiodic report receiver 1230 may receive, from the UE, the aperiodic report that includes one or more DMRS configurations of the subset for DMRS configurations that were addressed for selection and reporting and one or more corresponding CQIs or corresponding CSF in response to the message.

In some cases, the aperiodic report includes a refreshed list of one or more bundles of a DMRS and corresponding CQIs selected by the UE or configured for reporting.

The configuration transmitter 1235 may transmit, to the UE, a configuration for the aperiodic report, the configuration indicating a number of bundles of a DMRS and a corresponding CQI or CSF, a list of DMRS configurations for including in the aperiodic report, or any combination thereof.

The joint report receiver 1240 may receive an extended joint DMRS and CSF report from the UE in response to the message.

In some cases, the extended joint DMRS and CSF report includes one or more bundles of a DMRS and a corresponding CQI, a joint subband DMRS and CSF report, a joint DMRS and CSF report per transport block or per code division multiplexing group, or any combination thereof.

The configuration change transmitter 1245 may transmit a DMRS configuration change message to the UE based on the extended joint DMRS and CSF report, the extended joint DMRS and CSF report transmitted according to a set of transmission parameters based on a CQI or CSF of a DMRS and a corresponding CQI or CSF bundle selected by the UE.

The threshold transmitter 1250 may transmit, to the UE, the threshold for determination of the UE request for the DMRS change.

Figure 13:
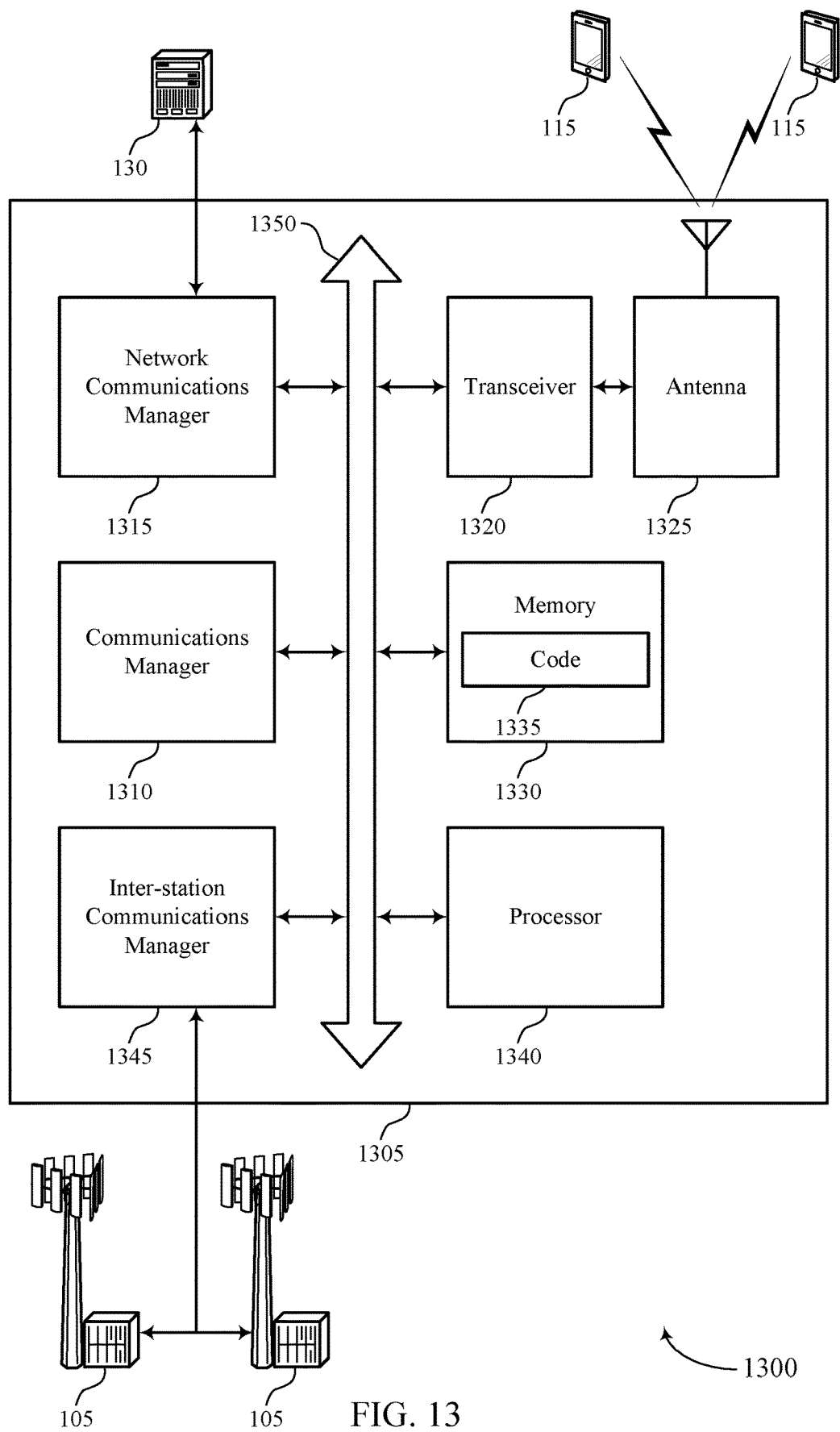
FIG. 13 shows a diagram of a system including a device that supports two step reporting procedure for DMRS configuration adjustment in accordance with aspects of the present disclosure.

FIG. 13 shows a diagram of a system 1300 including a device 1305 that supports two step reporting procedure for DMRS configuration adjustment in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a set of DMRS configurations supported by a UE served by the base station based on a capability of the UE, transmit, to the UE, control information indicating a subset of DMRS configurations of the set of DMRS configurations to be addressed for DMRS configuration selection and reporting, and receive, from the UE, a report including an indication of a UE request for a DMRS configuration change based on a set of link quality characteristics at the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting two step reporting procedure for DMRS configuration adjustment).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
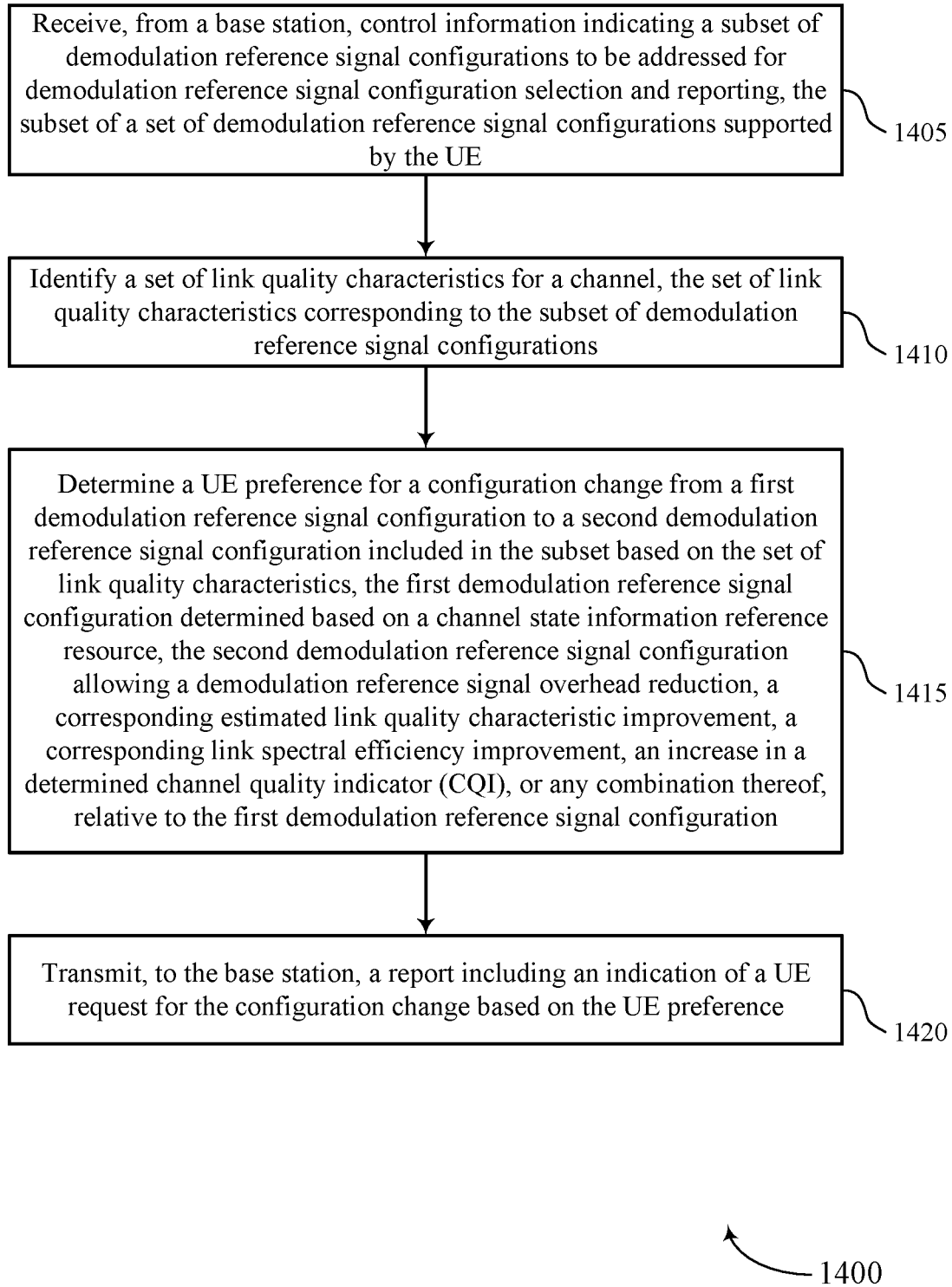
FIGS. 14 through 20 show flowcharts illustrating methods that support two step reporting procedure for DMRS configuration adjustment in accordance with aspects of the present disclosure.

FIG. 14 shows a flowchart illustrating a method 1400 that supports two step reporting procedure for DMRS configuration adjustment in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, control information indicating a subset of DMRS configurations to be addressed for DMRS configuration selection and reporting, the subset of a set of DMRS configurations supported by the UE. The operations of 1405 may be performed according to the methods described herein. In some examples, aspects of the operations of 1405 may be performed by a control receiver as described with reference to FIGS. 6 through 9.

At 1410, the UE may identify a set of link quality characteristics for a channel, the set of link quality characteristics corresponding to the subset of DMRS configurations. The operations of 1410 may be performed according to the methods described herein. In some examples, aspects of the operations of 1410 may be performed by a link quality manager as described with reference to FIGS. 6 through 9.

At 1415, the UE may determine a UE preference for a configuration change from a first DMRS configuration to a second DMRS configuration included in the subset based on the set of link quality characteristics, the first DMRS configuration determined based on a CSI reference resource, the second DMRS configuration allowing a DMRS overhead reduction, a corresponding estimated link quality characteristic improvement, a corresponding link spectral efficiency improvement, an increase in a determined CQI, or any combination thereof, relative to the first DMRS configuration. The operations of 1415 may be performed according to the methods described herein. In some examples, aspects of the operations of 1415 may be performed by a configuration change manager as described with reference to FIGS. 6 through 9.

At 1420, the UE may transmit, to the base station, a report including an indication of a UE request for the configuration change based on the UE preference. The operations of 1420 may be performed according to the methods described herein. In some examples, aspects of the operations of 1420 may be performed by a report transmitter as described with reference to FIGS. 6 through 9.

Figure 15:
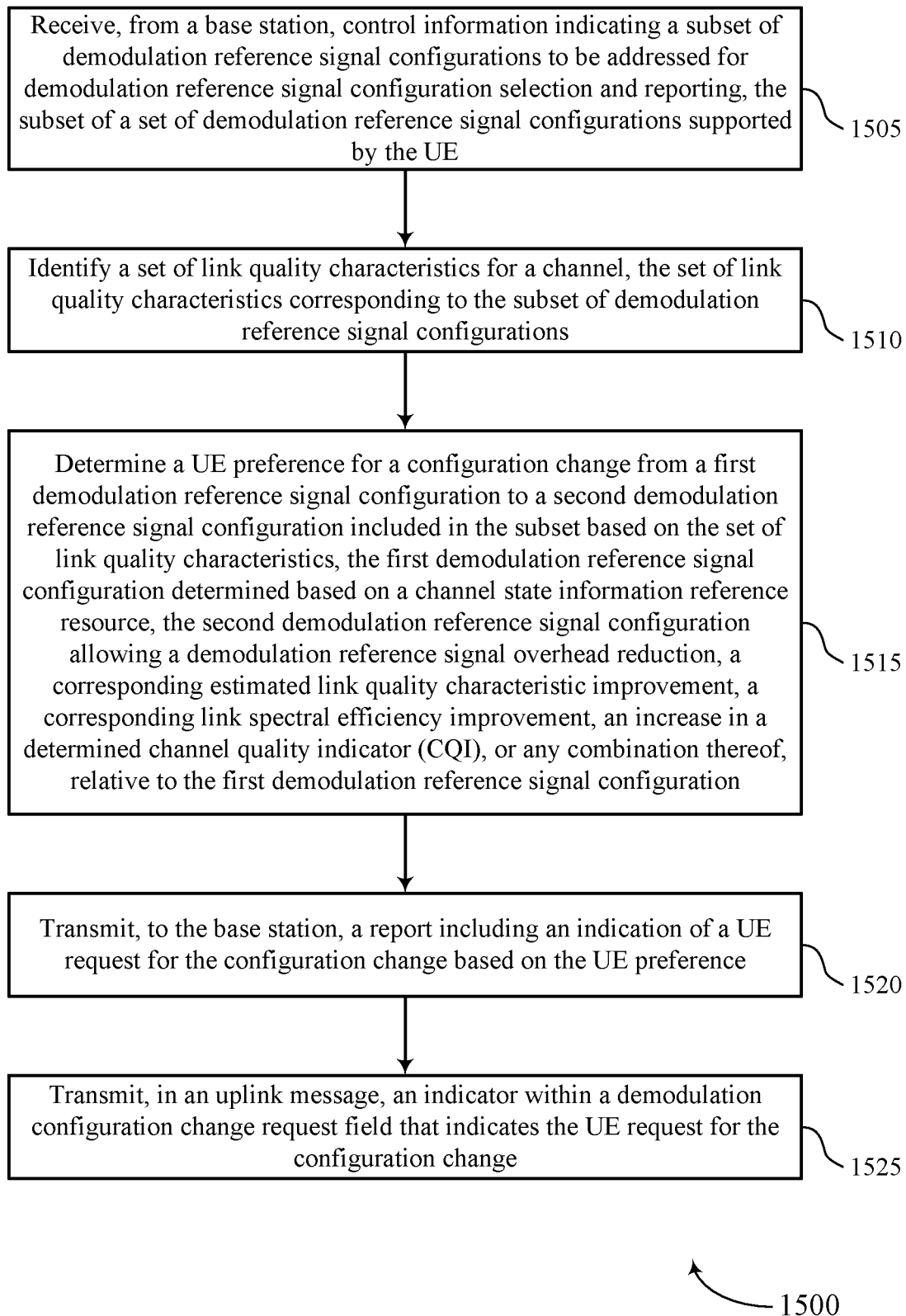

FIG. 15 shows a flowchart illustrating a method 1500 that supports two step reporting procedure for DMRS configuration adjustment in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, control information indicating a subset of DMRS configurations to be addressed for DMRS configuration selection and reporting, the subset of a set of DMRS configurations supported by the UE. The operations of 1505 may be performed according to the methods described herein. In some examples, aspects of the operations of 1505 may be performed by a control receiver as described with reference to FIGS. 6 through 9.

At 1510, the UE may identify a set of link quality characteristics for a channel, the set of link quality characteristics corresponding to the subset of DMRS configurations. The operations of 1510 may be performed according to the methods described herein. In some examples, aspects of the operations of 1510 may be performed by a link quality manager as described with reference to FIGS. 6 through 9.

At 1515, the UE may determine a UE preference for a configuration change from a first DMRS configuration to a second DMRS configuration included in the subset based on the set of link quality characteristics, the first DMRS configuration determined based on a CSI reference resource, the second DMRS configuration allowing a DMRS overhead reduction, a corresponding estimated link quality characteristic improvement, a corresponding link spectral efficiency improvement, an increase in a determined CQI, or any combination thereof, relative to the first DMRS configuration. The operations of 1515 may be performed according to the methods described herein. In some examples, aspects of the operations of 1515 may be performed by a configuration change manager as described with reference to FIGS. 6 through 9.

At 1520, the UE may transmit, to the base station, a report including an indication of a UE request for the configuration change based on the UE preference. The operations of 1520 may be performed according to the methods described herein. In some examples, aspects of the operations of 1520 may be performed by a report transmitter as described with reference to FIGS. 6 through 9.

At 1525, the UE may transmit, in an uplink message, an indicator within a demodulation configuration change request field that indicates the UE request for the configuration change. The operations of 1525 may be performed according to the methods described herein. In some examples, aspects of the operations of 1525 may be performed by a report transmitter as described with reference to FIGS. 6 through 9.

Figure 16:
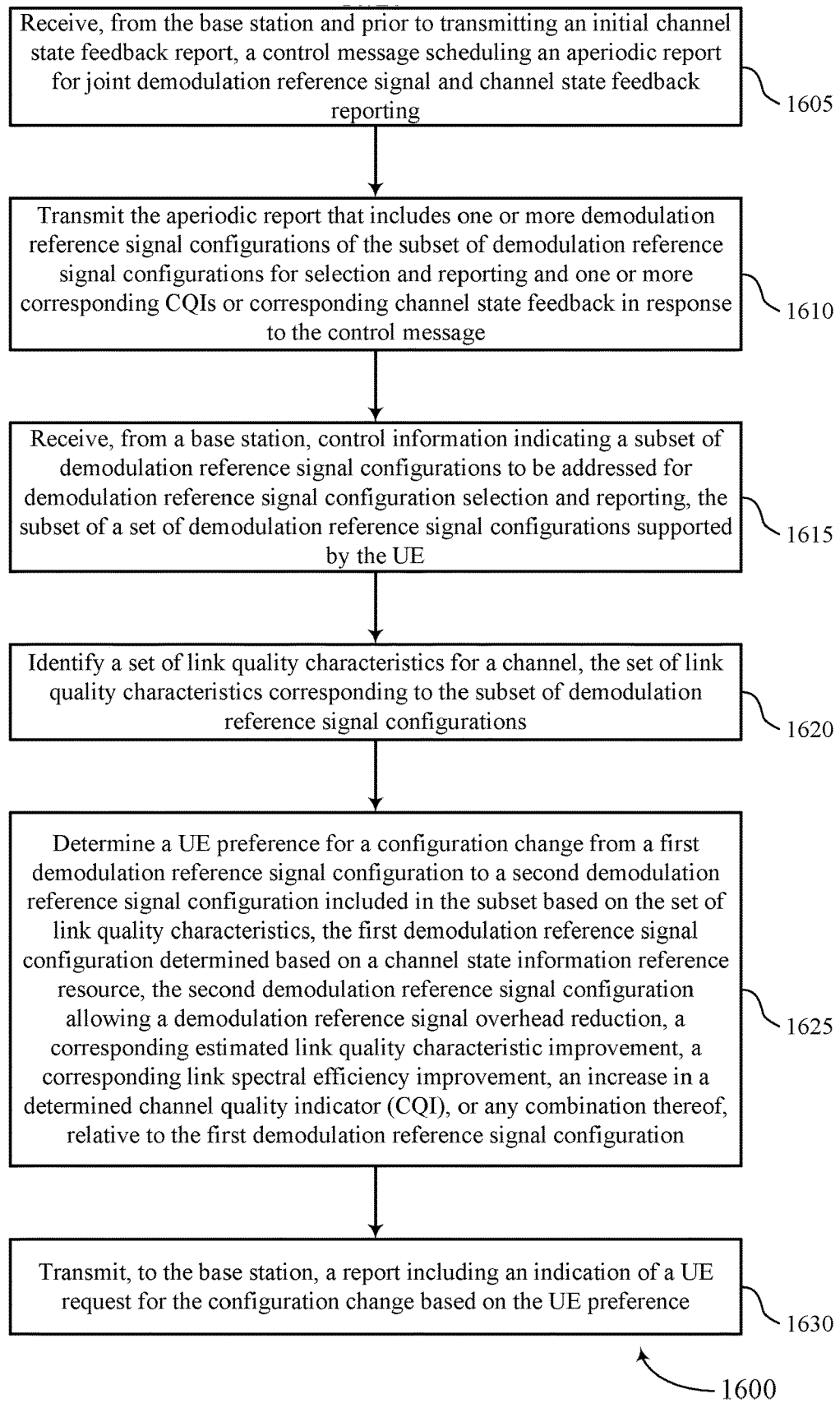

FIG. 16 shows a flowchart illustrating a method 1600 that supports two step reporting procedure for DMRS configuration adjustment in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from the base station and prior to transmitting an initial CSF report, a control message scheduling an aperiodic report for joint DMRS and CSF reporting. The operations of 1605 may be performed according to the methods described herein. In some examples, aspects of the operations of 1605 may be performed by a scheduling receiver as described with reference to FIGS. 6 through 9.

At 1610, the UE may transmit the aperiodic report that includes one or more DMRS configurations of the subset of DMRS configurations for selection and reporting and one or more corresponding CQIs or corresponding CSF in response to the control message. The operations of 1610 may be performed according to the methods described herein. In some examples, aspects of the operations of 1610 may be performed by an aperiodic report transmitter as described with reference to FIGS. 6 through 9.

At 1615, the UE may receive, from a base station, control information indicating a subset of DMRS configurations to be addressed for DMRS configuration selection and reporting, the subset of a set of DMRS configurations supported by the UE. The operations of 1615 may be performed according to the methods described herein. In some examples, aspects of the operations of 1615 may be performed by a control receiver as described with reference to FIGS. 6 through 9.

At 1620, the UE may identify a set of link quality characteristics for a channel, the set of link quality characteristics corresponding to the subset of DMRS configurations. The operations of 1620 may be performed according to the methods described herein. In some examples, aspects of the operations of 1620 may be performed by a link quality manager as described with reference to FIGS. 6 through 9.

At 1625, the UE may determine a UE preference for a configuration change from a first DMRS configuration to a second DMRS configuration included in the subset based on the set of link quality characteristics, the first DMRS configuration determined based on a CSI reference resource, the second DMRS configuration allowing a DMRS overhead reduction, a corresponding estimated link quality characteristic improvement, a corresponding link spectral efficiency improvement, an increase in a determined CQI, or any combination thereof, relative to the first DMRS configuration. The operations of 1625 may be performed according to the methods described herein. In some examples, aspects of the operations of 1625 may be performed by a configuration change manager as described with reference to FIGS. 6 through 9.

At 1630, the UE may transmit, to the base station, a report including an indication of a UE request for the configuration change based on the UE preference. The operations of 1630 may be performed according to the methods described herein. In some examples, aspects of the operations of 1630 may be performed by a report transmitter as described with reference to FIGS. 6 through 9.

Figure 17:
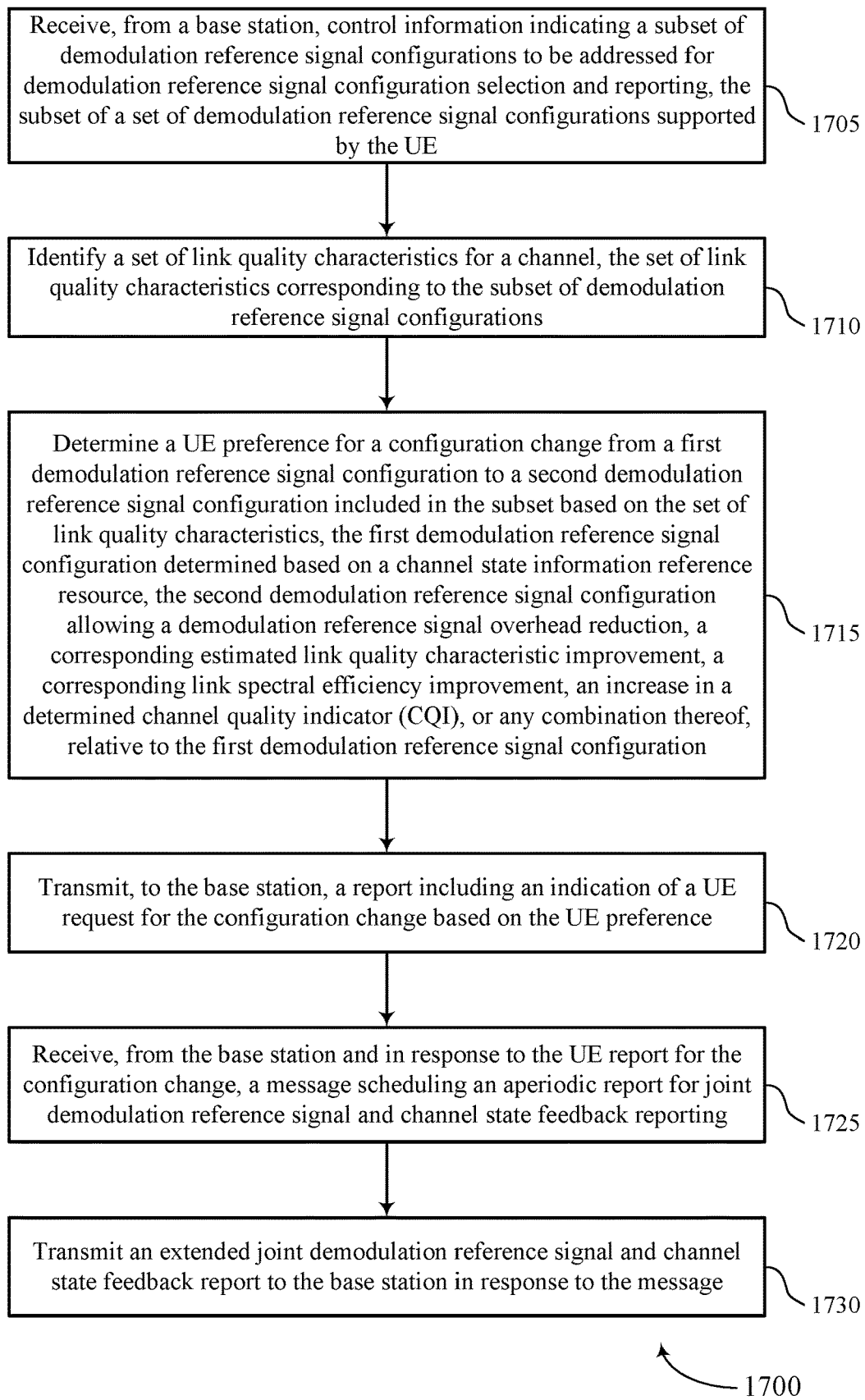

FIG. 17 shows a flowchart illustrating a method 1700 that supports two step reporting procedure for DMRS configuration adjustment in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, control information indicating a subset of DMRS configurations to be addressed for DMRS configuration selection and reporting, the subset of a set of DMRS configurations supported by the UE. The operations of 1705 may be performed according to the methods described herein. In some examples, aspects of the operations of 1705 may be performed by a control receiver as described with reference to FIGS. 6 through 9.

At 1710, the UE may identify a set of link quality characteristics for a channel, the set of link quality characteristics corresponding to the subset of DMRS configurations. The operations of 1710 may be performed according to the methods described herein. In some examples, aspects of the operations of 1710 may be performed by a link quality manager as described with reference to FIGS. 6 through 9.

At 1715, the UE may determine a UE preference for a configuration change from a first DMRS configuration to a second DMRS configuration included in the subset based on the set of link quality characteristics, the first DMRS configuration determined based on a CSI reference resource, the second DMRS configuration allowing a DMRS overhead reduction, a corresponding estimated link quality characteristic improvement, a corresponding link spectral efficiency improvement, an increase in a determined CQI, or any combination thereof, relative to the first DMRS configuration. The operations of 1715 may be performed according to the methods described herein. In some examples, aspects of the operations of 1715 may be performed by a configuration change manager as described with reference to FIGS. 6 through 9.

At 1720, the UE may transmit, to the base station, a report including an indication of a UE request for the configuration change based on the UE preference. The operations of 1720 may be performed according to the methods described herein. In some examples, aspects of the operations of 1720 may be performed by a report transmitter as described with reference to FIGS. 6 through 9.

At 1725, the UE may receive, from the base station and in response to the UE report for the configuration change, a message scheduling an aperiodic report for joint DMRS and CSF reporting. The operations of 1725 may be performed according to the methods described herein. In some examples, aspects of the operations of 1725 may be performed by a scheduling receiver as described with reference to FIGS. 6 through 9.

At 1730, the UE may transmit an extended joint DMRS and CSF report to the base station in response to the message. The operations of 1730 may be performed according to the methods described herein. In some examples, aspects of the operations of 1730 may be performed by a joint report transmitter as described with reference to FIGS. 6 through 9.

Figure 18:
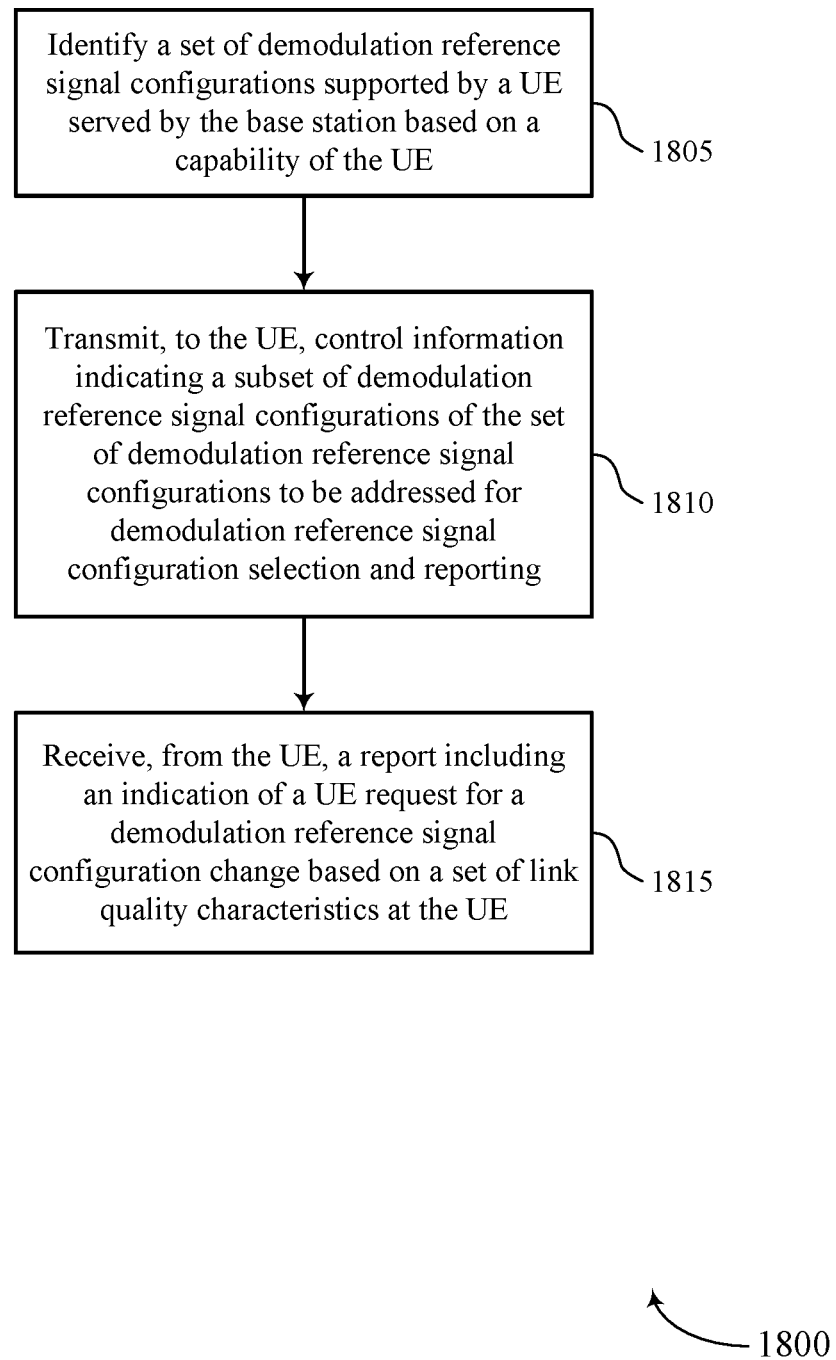

FIG. 18 shows a flowchart illustrating a method 1800 that supports two step reporting procedure for DMRS configuration adjustment in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may identify a set of DMRS configurations supported by a UE served by the base station based on a capability of the UE. The operations of 1805 may be performed according to the methods described herein. In some examples, aspects of the operations of 1805 may be performed by a configuration identifier as described with reference to FIGS. 10 through 13.

At 1810, the base station may transmit, to the UE, control information indicating a subset of DMRS configurations of the set of DMRS configurations to be addressed for DMRS configuration selection and reporting. The operations of 1810 may be performed according to the methods described herein. In some examples, aspects of the operations of 1810 may be performed by a control transmitter as described with reference to FIGS. 10 through 13.

At 1815, the base station may receive, from the UE, a report including an indication of a UE request for a DMRS configuration change based on a set of link quality characteristics at the UE. The operations of 1815 may be performed according to the methods described herein. In some examples, aspects of the operations of 1815 may be performed by a report receiver as described with reference to FIGS. 10 through 13.

Figure 19:
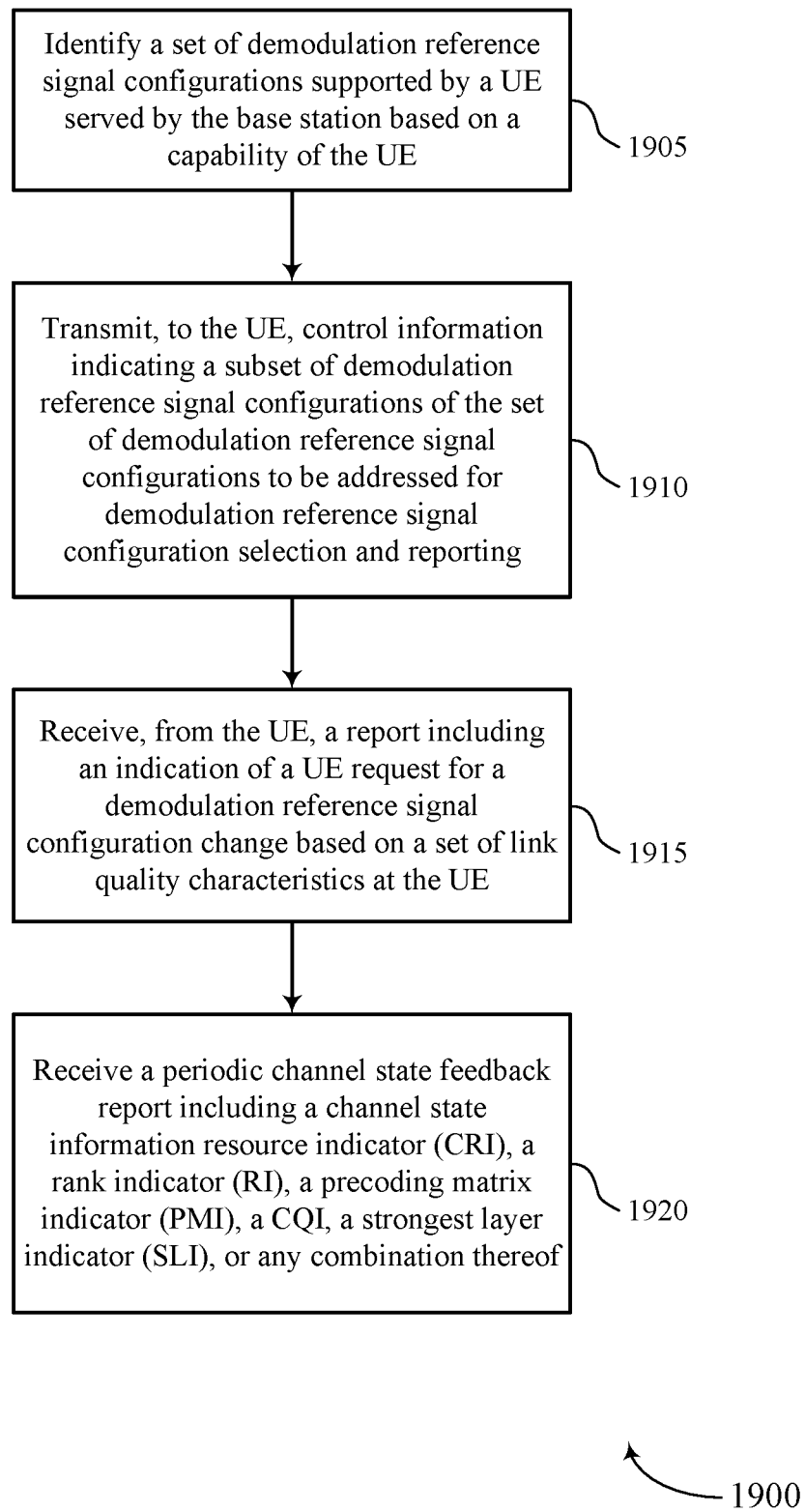

FIG. 19 shows a flowchart illustrating a method 1900 that supports two step reporting procedure for DMRS configuration adjustment in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may identify a set of DMRS configurations supported by a UE served by the base station based on a capability of the UE. The operations of 1905 may be performed according to the methods described herein. In some examples, aspects of the operations of 1905 may be performed by a configuration identifier as described with reference to FIGS. 10 through 13.

At 1910, the base station may transmit, to the UE, control information indicating a subset of DMRS configurations of the set of DMRS configurations to be addressed for DMRS configuration selection and reporting. The operations of 1910 may be performed according to the methods described herein. In some examples, aspects of the operations of 1910 may be performed by a control transmitter as described with reference to FIGS. 10 through 13.

At 1915, the base station may receive, from the UE, a report including an indication of a UE request for a DMRS configuration change based on a set of link quality characteristics at the UE. The operations of 1915 may be performed according to the methods described herein. In some examples, aspects of the operations of 1915 may be performed by a report receiver as described with reference to FIGS. 10 through 13.

At 1920, the base station may receive a periodic CSF report including a CRI, a RI, a PMI, a CQI, SLI, or any combination thereof. The operations of 1920 may be performed according to the methods described herein. In some examples, aspects of the operations of 1920 may be performed by a report receiver as described with reference to FIGS. 10 through 13.

Figure 20:
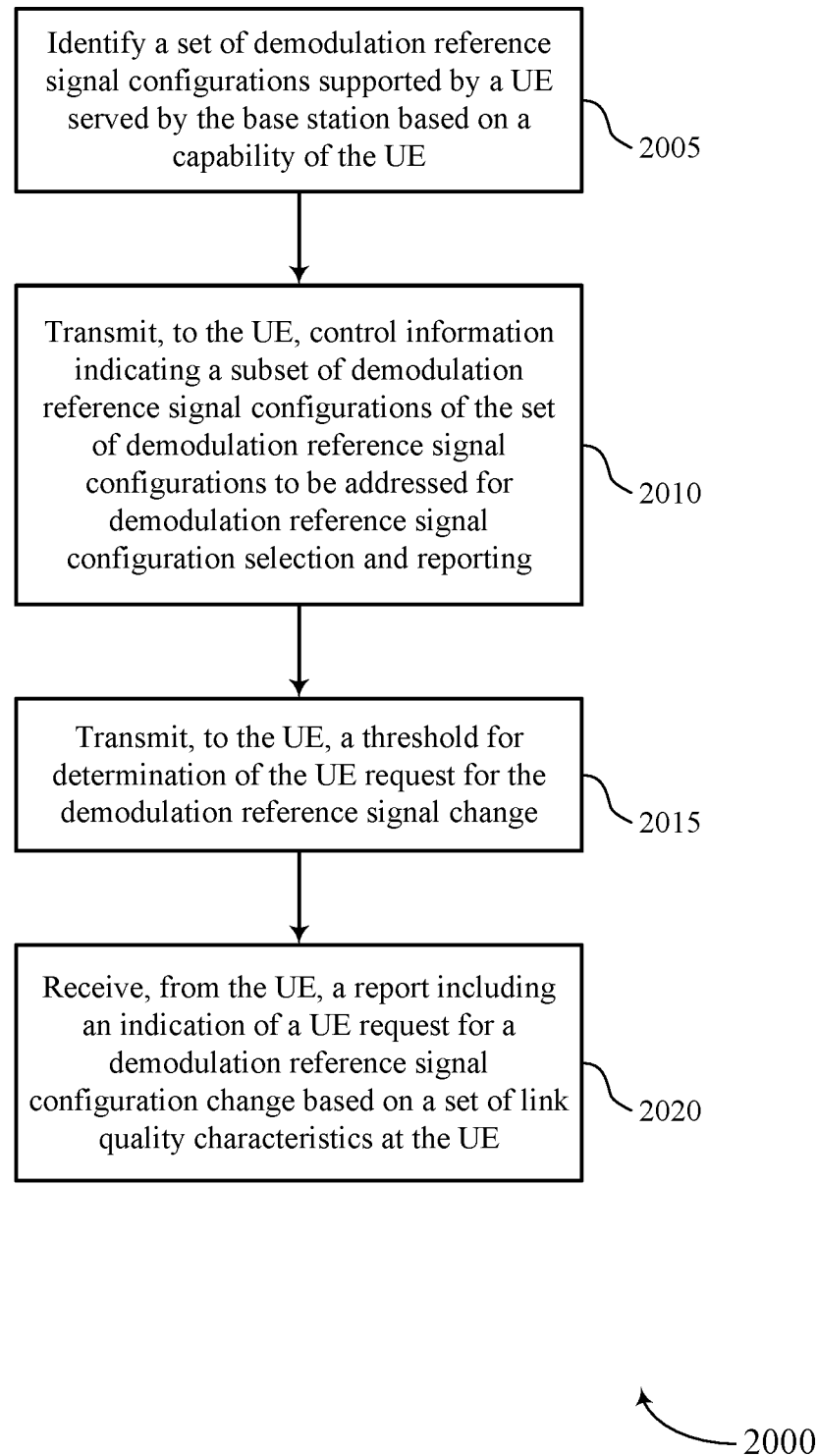

FIG. 20 shows a flowchart illustrating a method 2000 that supports two step reporting procedure for DMRS configuration adjustment in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may identify a set of DMRS configurations supported by a UE served by the base station based on a capability of the UE. The operations of 2005 may be performed according to the methods described herein. In some examples, aspects of the operations of 2005 may be performed by a configuration identifier as described with reference to FIGS. 10 through 13.

At 2010, the base station may transmit, to the UE, control information indicating a subset of DMRS configurations of the set of DMRS configurations to be addressed for DMRS configuration selection and reporting. The operations of 2010 may be performed according to the methods described herein. In some examples, aspects of the operations of 2010 may be performed by a control transmitter as described with reference to FIGS. 10 through 13.

At 2015, the base station may transmit, to the UE, the threshold for determination of the UE request for the DMRS change. The operations of 2015 may be performed according to the methods described herein. In some examples, aspects of the operations of 2015 may be performed by a threshold transmitter as described with reference to FIGS. 10 through 13.

At 2020, the base station may receive, from the UE, a report including an indication of a UE request for a DMRS configuration change based on a set of link quality characteristics at the UE. The operations of 2020 may be performed according to the methods described herein. In some examples, aspects of the operations of 2020 may be performed by a report receiver as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a base station, control information indicating a subset of demodulation reference signal configurations to be addressed for demodulation reference signal configuration selection and reporting, the subset of demodulation reference signal configurations being of a plurality of demodulation reference signal configurations supported by the UE;
   identifying a plurality of link quality characteristics for a channel, the plurality of link quality characteristics corresponding to the subset of demodulation reference signal configurations;
   determining a UE preference for a configuration change from a first demodulation reference signal configuration to a second demodulation reference signal configuration included in the subset of demodulation reference signal configurations based at least in part on the plurality of link quality characteristics, the first demodulation reference signal configuration determined based on a channel state information reference resource, the second demodulation reference signal configuration allowing a demodulation reference signal overhead reduction, a corresponding estimated link quality characteristic improvement, a corresponding link spectral efficiency improvement, an increase in a determined channel quality indicator (CQI), or any combination thereof, relative to the first demodulation reference signal configuration; and
   transmitting, to the base station, a report comprising an indication of a UE request for the configuration change based at least in part on the UE preference.

2. The method of claim 1, wherein transmitting the report comprises:
   transmitting a periodic channel state feedback report comprising a channel state information resource indicator (CRI), a rank indicator (RI), a precoding matrix indicator (PMI), a CQI, a strongest layer indicator (SLI), or any combination thereof.

3. The method of claim 1, wherein transmitting the report comprises:
   transmitting, in an uplink message, an indicator within a demodulation configuration change request field that indicates the UE request for the configuration change.

4. The method of claim 3, wherein the indicator is a one bit indicator.

5. The method of claim 1, further comprising:
   receiving, from the base station and prior to transmitting an initial channel state feedback report, a control message scheduling an aperiodic report for joint demodulation reference signal and channel state feedback reporting; and
   transmitting the aperiodic report that includes one or more demodulation reference signal configurations of the subset of demodulation reference signal configurations for selection and reporting and one or more corresponding CQIs or corresponding channel state feedback in response to the control message.

6. The method of claim 5, wherein receiving the control message comprises:
   receiving the control message after completion of a long discontinuous reception cycle duration, a beam switch procedure, a reconfiguration of the UE, or any combination thereof.

7. The method of claim 5, wherein the aperiodic report comprises a refreshed list of one or more bundles of a demodulation reference signal and corresponding CQIs selected by the UE or configured for reporting.

8. The method of claim 5, further comprising:
   selecting one or more of the subset of demodulation reference signal configurations associated with one or more scheduling scenarios and configured by the base station to be addressed by the aperiodic report, wherein the aperiodic report includes the one or more of the subset of demodulation reference signal configurations and a corresponding one or more CQIs or channel state feedback.

9. The method of claim 8, further comprising:
receiving, from the base station, a configuration for the aperiodic report, the configuration indicating a list of demodulation reference signal configurations to be addressed in the aperiodic report, wherein the one or more of the subset of the demodulation reference signal configurations are selected based at least in part on the configuration and wherein the one or more of the subset of the demodulation reference signal configurations are reported with corresponding CQIs or corresponding channel state feedback.

10. The method of claim 1, further comprising:
receiving, from the base station and in response to the report, a message scheduling an aperiodic report for joint demodulation reference signal and channel state feedback reporting; and
transmitting an extended joint demodulation reference signal and channel state feedback report to the base station in response to the message.

11. The method of claim 10, wherein the extended joint demodulation reference signal and channel state feedback report comprises one or more bundles of a demodulation reference signal and a corresponding CQI, a joint subband demodulation reference signal and channel state feedback report, a joint demodulation reference signal and channel state feedback report per transport block or per code division multiplexing group, or any combination thereof.

12. The method of claim 11, further comprising:
determining each demodulation reference signal for the one or more reported bundles based at least in part on a configuration for the aperiodic report; and
determining respective CQIs for each demodulation reference signal of the one or more bundles.

13. The method of claim 1, further comprising:
determining that the demodulation reference signal overhead reduction, the corresponding estimated link quality characteristic improvement, the corresponding link spectral efficiency improvement, or any combination thereof, associated with the second demodulation reference signal configuration exceeds a threshold; and
determining a configuration change request bit based at least in part on the demodulation reference signal overhead reduction, the corresponding estimated link quality characteristic improvement, the corresponding link spectral efficiency improvement, or any combination thereof exceeding the threshold.

14. The method of claim 13, further comprising:
determining that the second demodulation reference signal configuration maintains at least a same CQI as the first demodulation reference signal configuration based at least in part on the plurality of link quality characteristics; and
determining the configuration change request bit based at least in part on the second demodulation reference signal configuration maintaining at least the same CQI as the first demodulation reference signal configuration.

15. The method of claim 1, further comprising:
determining a CQI index of the second demodulation reference signal configuration to be greater than a CQI index of the first demodulation reference signal configuration based at least in part on the plurality of link quality characteristics; and
determining a configuration change request bit based at least in part on the CQI index of the second demodulation reference signal configuration being greater than the CQI index of the first demodulation reference signal configuration.

16. A method for wireless communications at a base station, comprising:
identifying a plurality of demodulation reference signal configurations supported by a user equipment (UE) served by the base station based at least in part on a capability of the UE;
transmitting, to the UE, control information indicating a subset of demodulation reference signal configurations of the plurality of demodulation reference signal configurations to be addressed for demodulation reference signal configuration selection and reporting; and
receiving, from the UE, a report comprising an indication of a UE request for a demodulation reference signal configuration change based at least in part on a plurality of link quality characteristics at the UE.

17. The method of claim 16, wherein receiving the report comprises:
receiving a periodic channel state feedback report comprising a channel state information resource indicator (CRI), a rank indicator (RI), a precoding matrix indicator (PMI), a CQI, a strongest layer indicator (SLI), or any combination thereof.

18. The method of claim 16, wherein receiving the report comprises:
receiving, in an uplink message, an indicator within a demodulation configuration change request field that indicates the UE request for the demodulation reference signal configuration change.

19. The method of claim 16, further comprising:
transmitting, to the UE and prior to receiving an initial channel state feedback report from the UE, a message scheduling an aperiodic report for joint demodulation reference signal and channel state feedback reporting; and
receiving, from the UE, the aperiodic report that includes one or more demodulation reference signal configurations of the subset of demodulation reference signal configurations that were addressed for selection and reporting and one or more corresponding channel quality indicators (CQIs) or corresponding channel state feedback in response to the message.

20. The method of claim 19, wherein transmitting the message comprises:
transmitting the message after completion of a long discontinuous reception cycle duration, a beam switch procedure, a reconfiguration of the UE, or any combination thereof.

21. The method of claim 19, wherein the aperiodic report comprises a refreshed list of one or more bundles of a demodulation reference signal and corresponding CQIs selected by the UE or configured for reporting.

22. The method of claim 19, further comprising:
transmitting, to the UE, a configuration for the aperiodic report, the configuration indicating a number of bundles of a demodulation reference signal and a corresponding CQI or channel state feedback, a list of demodulation reference signal configurations for including in the aperiodic report, or any combination thereof.

23. The method of claim 16, further comprising:
transmitting, to the UE and in response to the report, a message scheduling an aperiodic report for joint demodulation reference signal and channel state feedback reporting; and
receiving an extended joint demodulation reference signal and channel state feedback report from the UE in response to the message.

24. The method of claim 23, wherein the extended joint demodulation reference signal and channel state feedback report comprises one or more bundles of a demodulation reference signal and a corresponding channel quality indicator (CQI), a joint subband demodulation reference signal and channel state feedback report, a joint demodulation reference signal and channel state feedback report per transport block or per code division multiplexing group, or any combination thereof.

25. The method of claim 16, wherein the indication of the UE request for the demodulation reference signal configuration change comprises a request for a configuration change from a first demodulation reference signal configuration to a second demodulation reference signal configuration, and wherein the second demodulation reference signal configuration allows a demodulation reference signal overhead reduction, a corresponding estimated link quality characteristic improvement, a corresponding link spectral efficiency improvement, an increase in a determined channel quality indicator (CQI), or any combination of thereof, relative to the first demodulation reference signal configuration by a threshold.

26. The method of claim 25, further comprising:
transmitting, to the UE, the threshold for determination of the UE request for the demodulation reference signal configuration change.

27. An apparatus for wireless communications at a user equipment (UE), comprising:
a processor,
memory coupled with the processor; and
instructions stored in the memory and executable by the processor to cause the apparatus to:
receive, from a base station, control information indicating a subset of demodulation reference signal configurations to be addressed for demodulation reference signal configuration selection and reporting, the subset of demodulation reference signal configurations being of a plurality of demodulation reference signal configurations supported by the UE;
identify a plurality of link quality characteristics for a channel, the plurality of link quality characteristics corresponding to the subset of demodulation reference signal configurations;
determine a UE preference for a configuration change from a first demodulation reference signal configuration to a second demodulation reference signal configuration included in the subset of demodulation reference signal configurations based at least in part on the plurality of link quality characteristics, the first demodulation reference signal configuration determined based on a channel state information reference resource, the second demodulation reference signal configuration allowing a demodulation reference signal overhead reduction, a corresponding estimated link quality characteristic improvement, a corresponding link spectral efficiency improvement, an increase in a determined channel quality indicator (CQI), or any combination thereof, relative to the first demodulation reference signal configuration; and
transmit, to the base station, a report comprising an indication of a UE request for the configuration change based at least in part on the UE preference.

28. The apparatus of claim 27, wherein the instructions to transmit the report are executable by the processor to cause the apparatus to:
transmit a periodic channel state feedback report comprising a channel state information resource indicator (CRI), a rank indicator (RI), a precoding matrix indicator (PMI), a CQI, a strongest layer indicator (SLI), or any combination thereof.

29. An apparatus for wireless communications at a base station, comprising:
a processor,
memory coupled with the processor; and
instructions stored in the memory and executable by the processor to cause the apparatus to:
identify a plurality of demodulation reference signal configurations supported by a user equipment (UE) served by the base station based at least in part on a capability of the UE;
transmit, to the UE, control information indicating a subset of demodulation reference signal configurations of the plurality of demodulation reference signal configurations to be addressed for demodulation reference signal configuration selection and reporting; and
receive, from the UE, a report comprising an indication of a UE request for a demodulation reference signal configuration change based at least in part on a plurality of link quality characteristics at the UE.

30. The apparatus of claim 29, wherein the instructions to receive the report are executable by the processor to cause the apparatus to:
receive a periodic channel state feedback report comprising a channel state information resource indicator (CRI), a rank indicator (RI), a precoding matrix indicator (PMI), a CQI, a strongest layer indicator (SLI), or any combination thereof.

* * * * *